May 17, 1966 N. B. COLEY ET AL 3,251,991
CONTROL SYSTEM FOR RAILWAY CAR RETARDERS
Filed Oct. 1, 1953 21 Sheets-Sheet 1

INVENTORS
N.B. COLEY AND
R.F. ALBRIGHTON
BY Forest B. Hitchcock
THEIR ATTORNEY

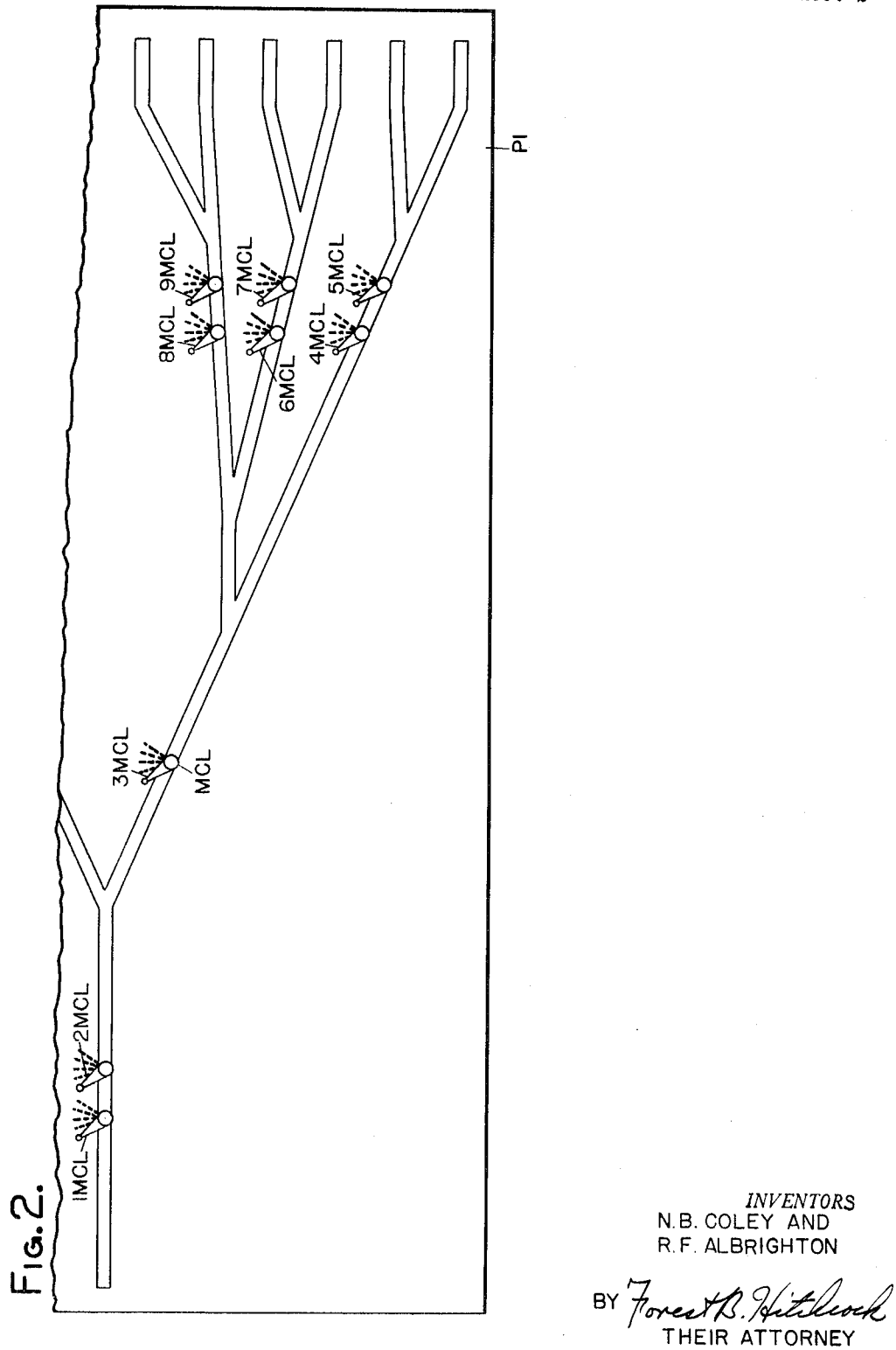

INVENTORS
N.B. COLEY AND
R.F. ALBRIGHTON
BY Forest B. Hitchcock
THEIR ATTORNEY

May 17, 1966　　　N. B. COLEY ET AL　　　3,251,991
CONTROL SYSTEM FOR RAILWAY CAR RETARDERS
Filed Oct. 1, 1953　　　　　　　　　　　　21 Sheets-Sheet 4

INVENTORS
N.B. COLEY AND
R.F. ALBRIGHTON

BY Forest B. Hitchcock
THEIR ATTORNEY

May 17, 1966     N. B. COLEY ET AL     3,251,991
CONTROL SYSTEM FOR RAILWAY CAR RETARDERS
Filed Oct. 1, 1953     21 Sheets-Sheet 5

INVENTORS
N.B. COLEY AND
R.F. ALBRIGHTON
BY Forest B. Hitchcock
THEIR ATTORNEY

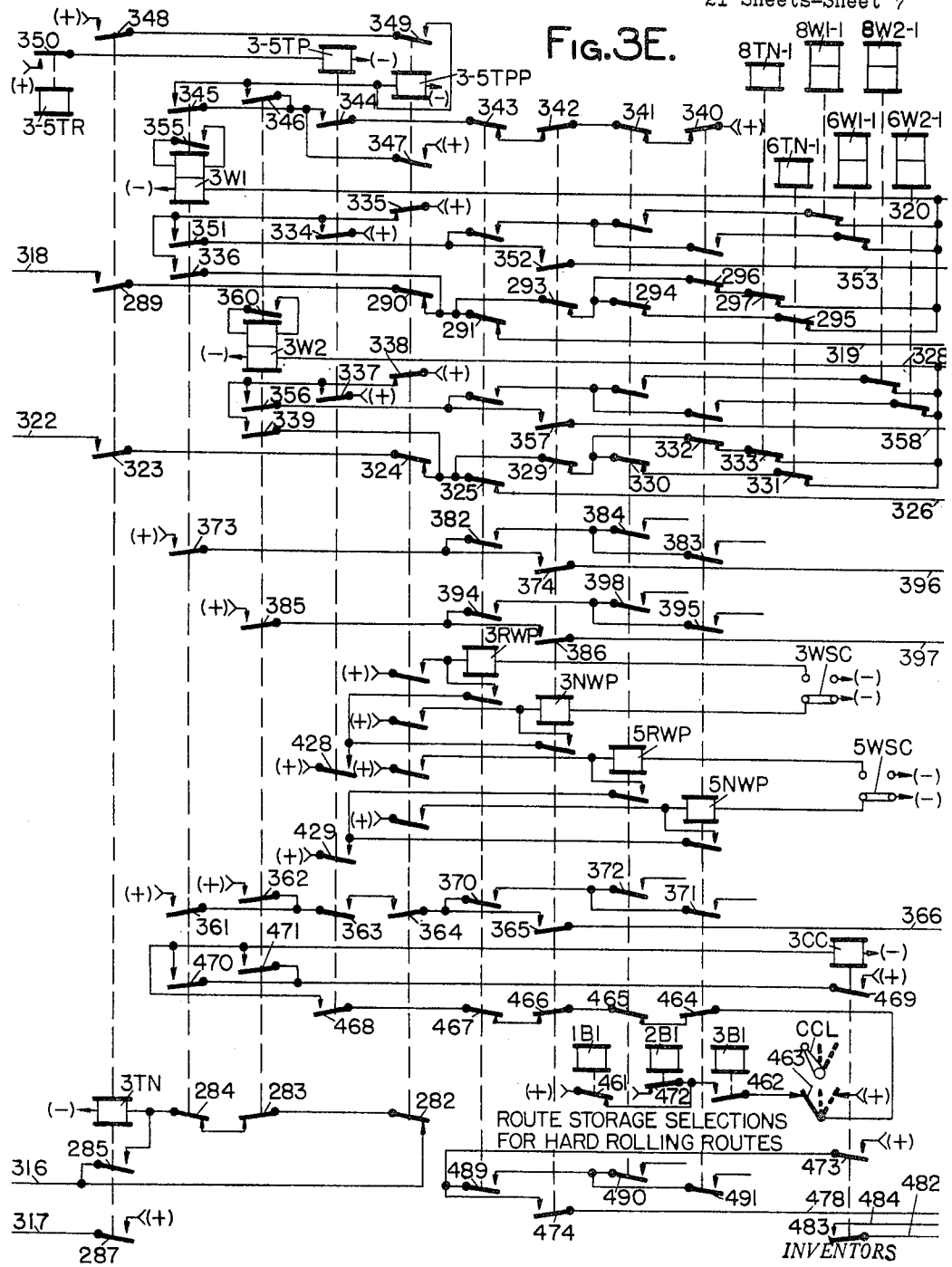

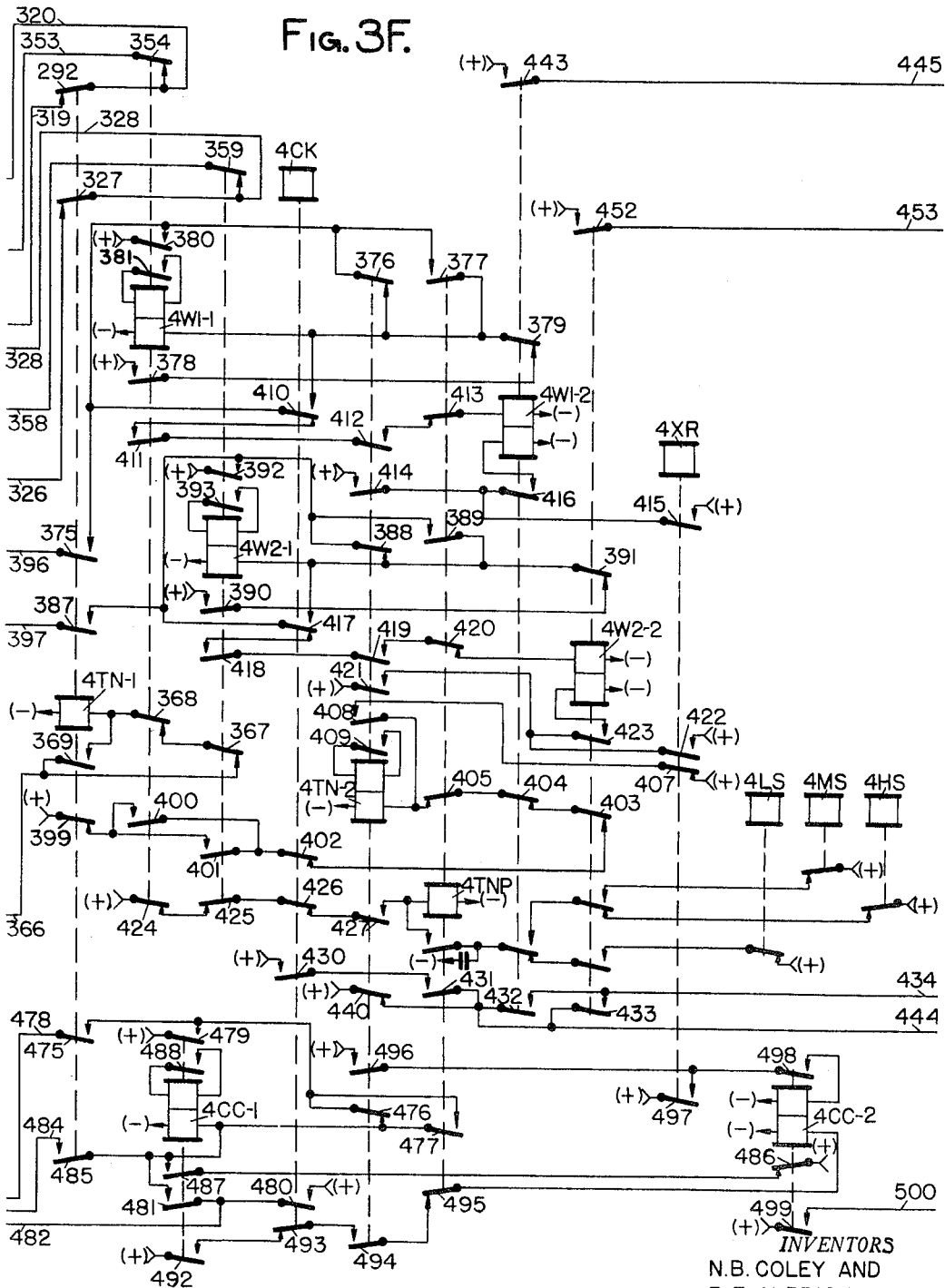

May 17, 1966
N. B. COLEY ET AL
3,251,991
CONTROL SYSTEM FOR RAILWAY CAR RETARDERS
Filed Oct. 1, 1953
21 Sheets-Sheet 9
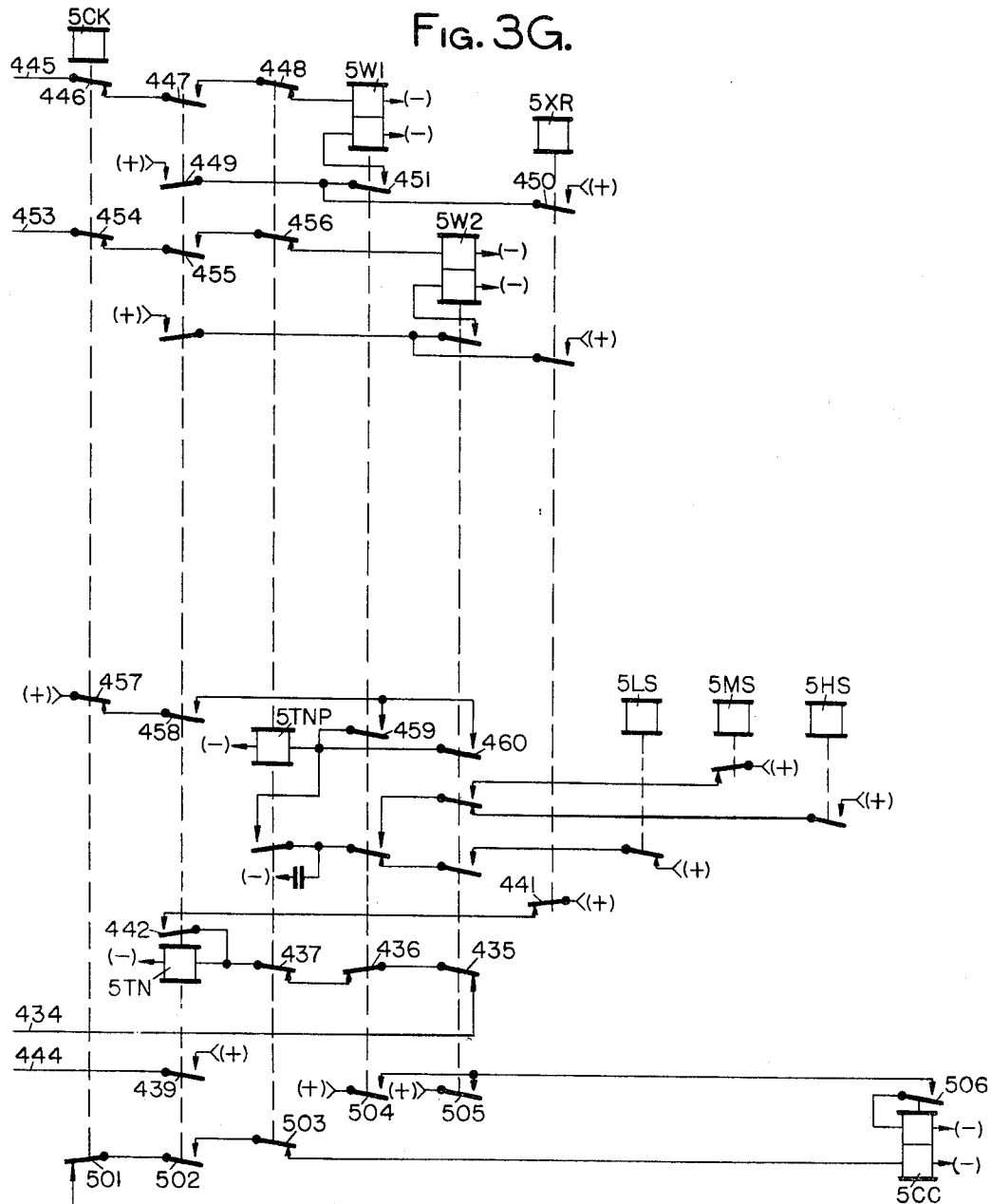
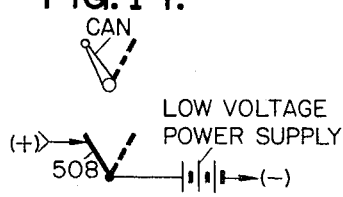
*INVENTORS*
N.B. COLEY AND
R.F. ALBRIGHTON
BY *Forest B. Hitchcock*
THEIR ATTORNEY May 17, 1966     N. B. COLEY ET AL     3,251,991
CONTROL SYSTEM FOR RAILWAY CAR RETARDERS
Filed Oct. 1, 1953     21 Sheets-Sheet 13

INVENTORS
N.B. COLEY AND
R.F. ALBRIGHTON
BY Forest B. Hitchcock
THEIR ATTORNEY

May 17, 1966  N. B. COLEY ET AL  3,251,991
CONTROL SYSTEM FOR RAILWAY CAR RETARDERS
Filed Oct. 1, 1953  21 Sheets-Sheet 15

INVENTORS
N.B. COLEY AND
R.F. ALBRIGHTON
BY *Forrest B. Hitchcock*
THEIR ATTORNEY May 17, 1966  N. B. COLEY ET AL  3,251,991
CONTROL SYSTEM FOR RAILWAY CAR RETARDERS
Filed Oct. 1, 1953  21 Sheets-Sheet 16
FIG.12R.
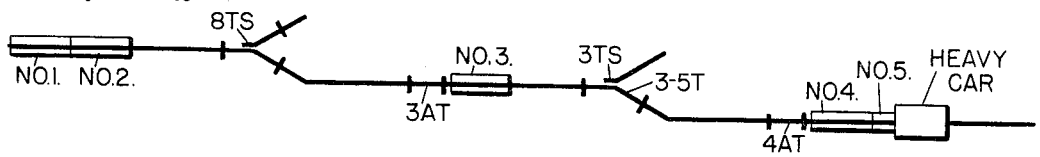
FIG.13R.
FIG.12S.
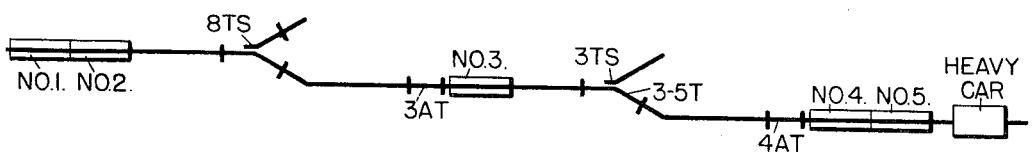
FIG.13S.
FIG.11.
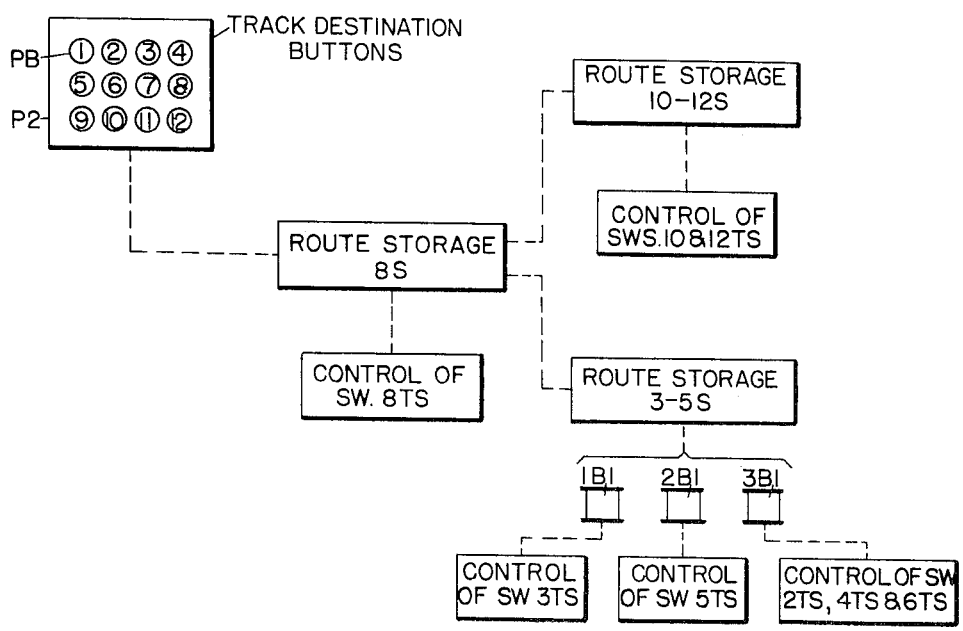
INVENTORS
N.B. COLEY AND
R.F. ALBRIGHTON
BY Forest B. Hitchcock
THEIR ATTORNEY May 17, 1966   N. B. COLEY ET AL   3,251,991
CONTROL SYSTEM FOR RAILWAY CAR RETARDERS
Filed Oct. 1, 1953   21 Sheets-Sheet 17

INVENTORS
N.B. COLEY AND
R. F. ALBRIGHTON

BY Forest B. Hitchcock
THEIR ATTORNEY

May 17, 1966   N. B. COLEY ET AL   3,251,991
CONTROL SYSTEM FOR RAILWAY CAR RETARDERS
Filed Oct. 1, 1953                                      21 Sheets-Sheet 18
FIG.12E.
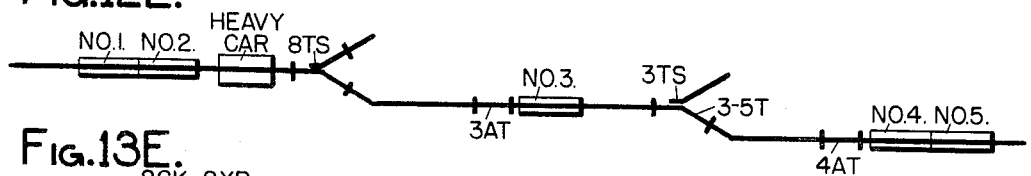
FIG.13E.
FIG.12F.
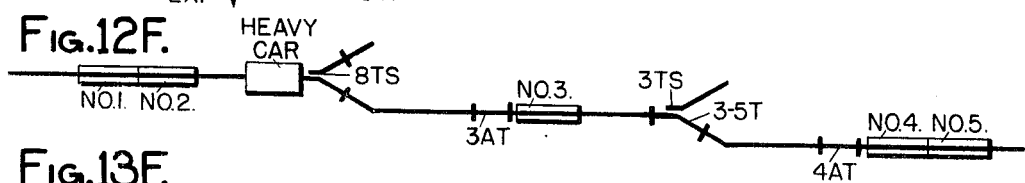
FIG.13F.
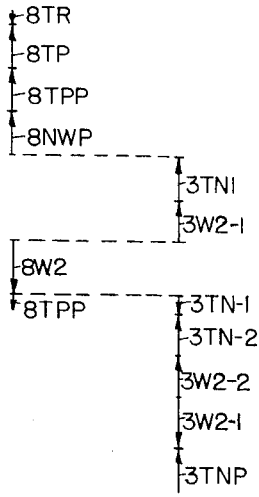
FIG.12G.
FIG.13G.
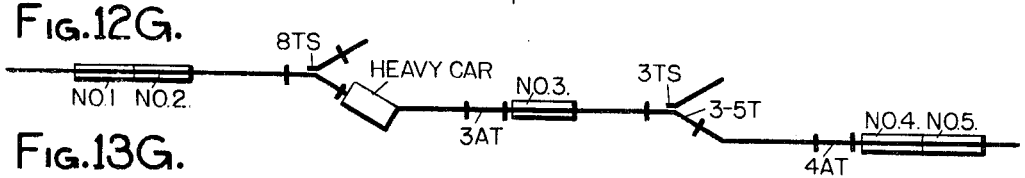
*INVENTORS*
N. B. COLEY AND
R. F. ALBRIGHTON
BY *Forest B. Hitchcock*
THEIR ATTORNEY May 17, 1966   N. B. COLEY ET AL   3,251,991
CONTROL SYSTEM FOR RAILWAY CAR RETARDERS
Filed Oct. 1, 1953                                    21 Sheets-Sheet 19

INVENTORS
N.B. COLEY AND
R.F. ALBRIGHTON
BY *Forest B. Hitchcock*
THEIR ATTORNEY May 17, 1966   N. B. COLEY ET AL   3,251,991
CONTROL SYSTEM FOR RAILWAY CAR RETARDERS
Filed Oct. 1, 1953   21 Sheets-Sheet 20

FIG.13M.   ↑3-5TP
           ↓3NWP

INVENTORS
N.B. COLEY AND
R.F. ALBRIGHTON
BY *Forest B. Hitchcock*
THEIR ATTORNEY May 17, 1966  N. B. COLEY ET AL  3,251,991
CONTROL SYSTEM FOR RAILWAY CAR RETARDERS
Filed Oct. 1, 1953  21 Sheets-Sheet 21

INVENTORS
N.B. COLEY AND
R.F. ALBRIGHTON

BY *Forest B. Hitchcock*
THEIR ATTORNEY

United States Patent Office 3,251,991
Patented May 17, 1966

3,251,991
CONTROL SYSTEM FOR RAILWAY CAR RETARDERS
Nelson B. Coley and Reginald F. Albrighton, Rochester, N.Y., assignors to General Signal Corporation, a corporation of New York
Filed Oct. 1, 1953, Ser. No. 383,432
37 Claims. (Cl. 246—182)

This invention relates to the control of railway car retarders of the track brake type wherein the braking of a car is accomplished by applying selected degrees of pressure against the rims of the car wheels by brake shoes disposed along the trackway. The invention more particularly pertains to means for automatically governing the degree of retardation in accordance with the weight and speed of a car.

Car retarders of this character are used primarily to regulate the speed of cars in hump classification yards, where cars and cuts of cars are released at the crest of a hump and allowed to coast to respective classification tracks. In such a system, the crest of the hump must be high enough for the hardest rolling and lightest car to be able to coast to the most distant destination for a car in a classification track. The speeds of cars varies materially because of different car weights, the cars being hard or easy rolling, the curvature of the track, etc.

There are generally three stages at which retardation is applied to cars as they progress from the hump to their respective classification tracks. The car retarders of the first stage are conveniently called "hump retarders"; the car retarders of the second stage are called "intermediate retarders"; and the car retarders of the third stage are called "group retarders." Most cars require some degree of retardation in each of these stages.

This application is to be considered as providing improvements over the prior U.S. application of N. B. Coley, Ser. No. 359,069, filed June 2, 1953, and no claim is made herein to the subject matter claimed in that prior application.

Generally speaking, and without attempting to define the scope of the present invention, the car retarder system according to the present invention comprises radar type speed responsive means for each car retarder having a directional antenna located near the exit end of the associated car retarder, and weight control means for each car retarder governed by the weights of cars as they pass through the retarder in accordance with car weights originally determined by a weighing device in approach to the first car retarder and transferred for the control of the respective car retarders each car passes through in accordance with the route and progress of the car. The radar type speed responsive means is radio detecting and ranging apparatus wherein transmitted ultrahigh-frequency radio waves are reflected from objects they encounter, and the speed of movement of an object such as a railway car is detected, for example, in the form of a beat frequency formed by the mixing of the frequency transmitted and the echo received from the car which varies in frequency with the speed of a car according to what is commonly known as a "Doppler effect." Such radar speed responsive means is disclosed in the U.S. patent application of H. C. Kendall et al., Ser. No. 359,162, filed June 8, 1953, now Patent No. 3,125,315.

For cars which are to be routed the greatest distance, and over more curved trackway, curve correction means is provided whereby these cars are permitted to leave the group car retarders at a higher rate of speed.

An object of the present invention is to obtain a general indication of the weight of a car before it enters the first hump car retarder, and then transfer that weight indication as the car progresses for the control of all car retarders the associated car is to pass through.

Another object of the present invention is to automatically modify the control of certain car retarders in accordance with route descriptions set up in a system of automatic switching.

Another object of the present invention is to render the radar speed responsive system operable to control speed relays for the first of a series of hump car retarders in response to the actuation of the weighing device in approach to that car retarder.

Another object of the present invention is to render the radar speed responsive means effective for a second of a series of car retarders in accordance with the actuation of an exit relay by a car about to leave the preceding car retarder.

Another object of the present invention is to render the speed responsive means effective for an intermediate car retarder in accordance with the occupancy by a car of an approach track circuit.

Another object of the present invention is to render the speed responsive means effective for the first car retarder of each of the group car retarders in accordance with the occupancy by a car of an approach track circuit.

Other objects, purposes, and characteristic features of the present invention will be in part obvious from the accompanying drawings and in part pointed out as the description of the invention progresses.

In describing the invention in detail, reference is made to the accompanying drawings in which parts having similar functions are generally identified by similar letter reference characters, and in which:

FIG. 2 is a partial view of a control panel for use in governing the manual operation of the car retarders;

Figure 4:
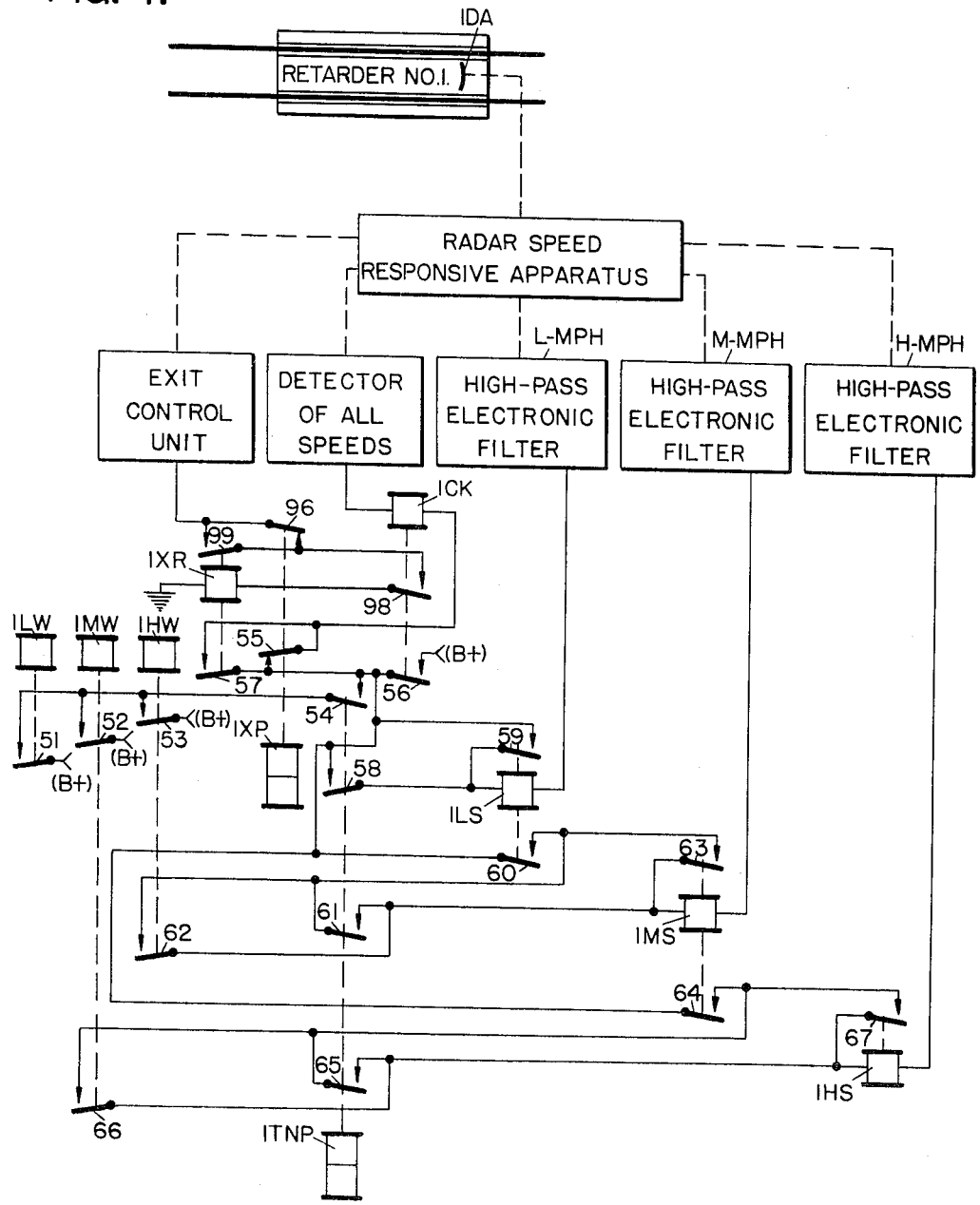
Figure 5:
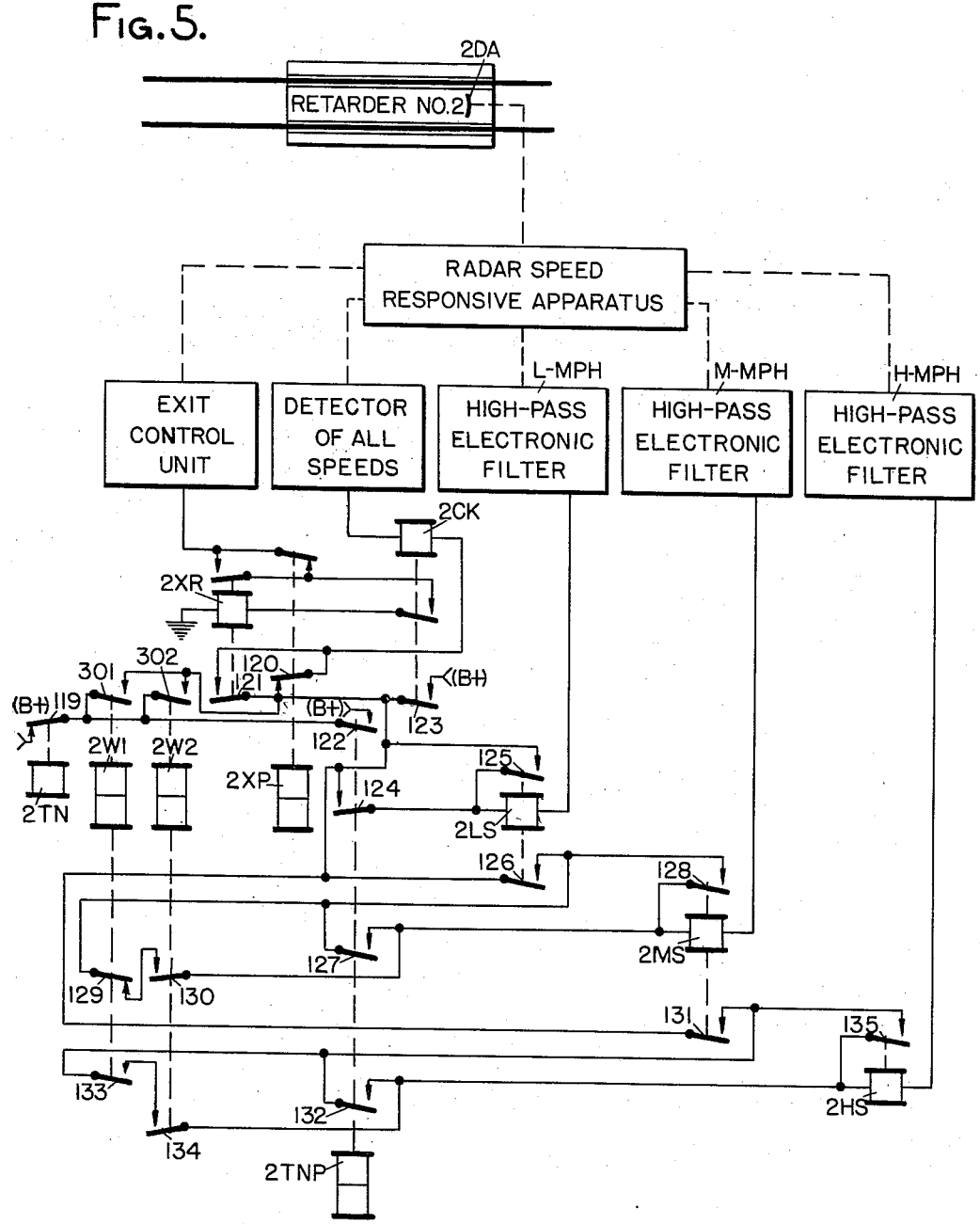
Figure 6:
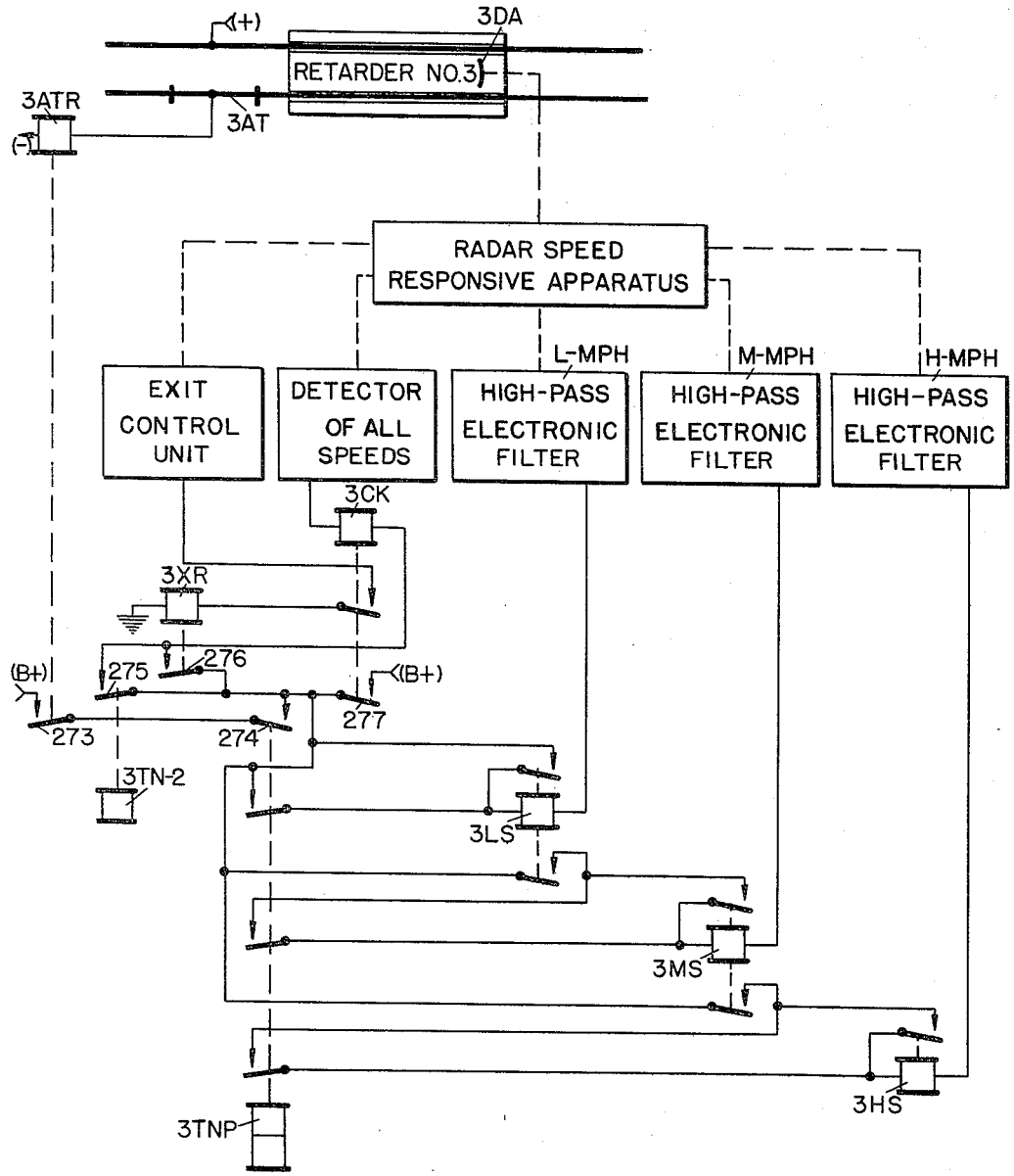
Figure 7:
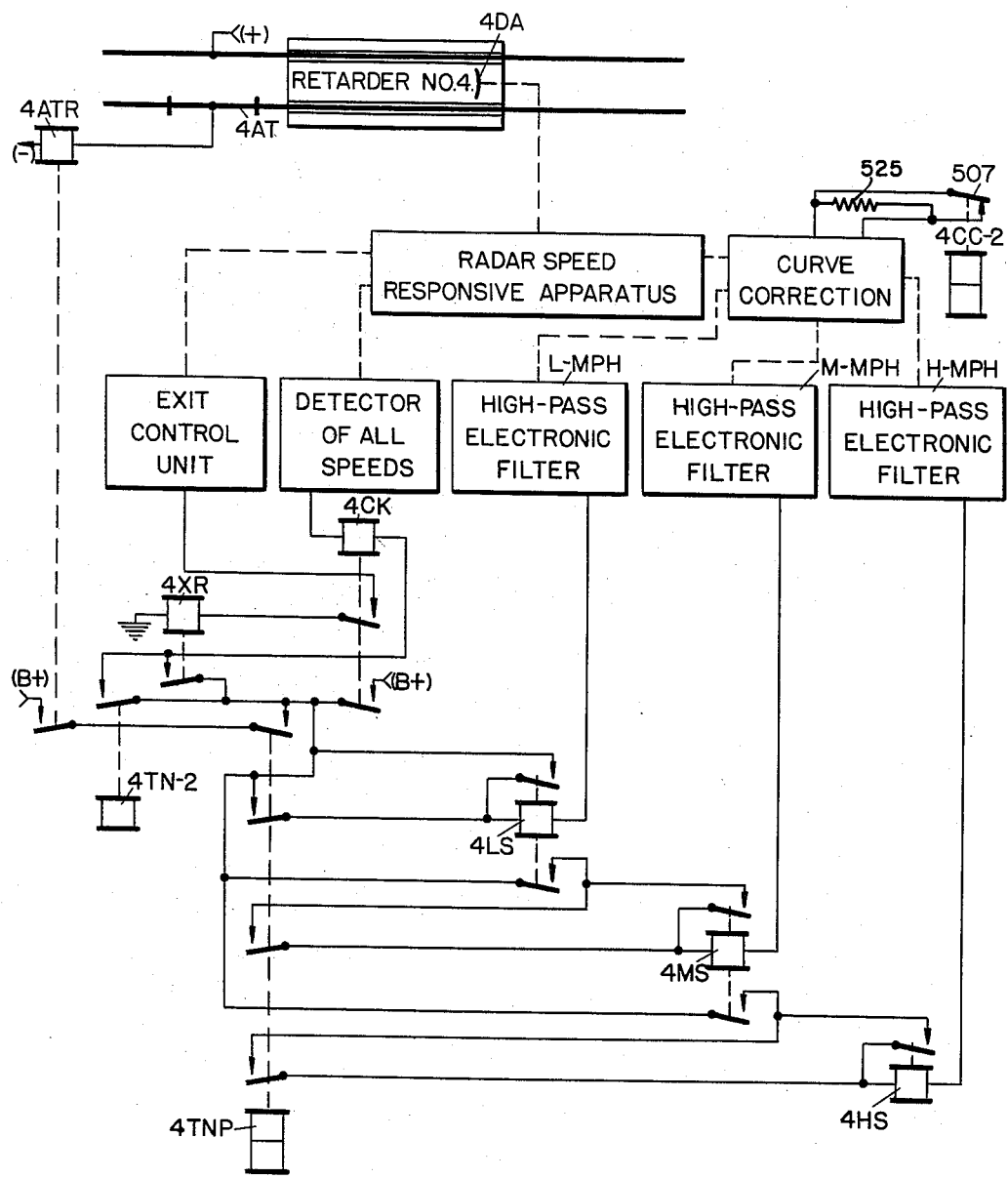
Figure 8:
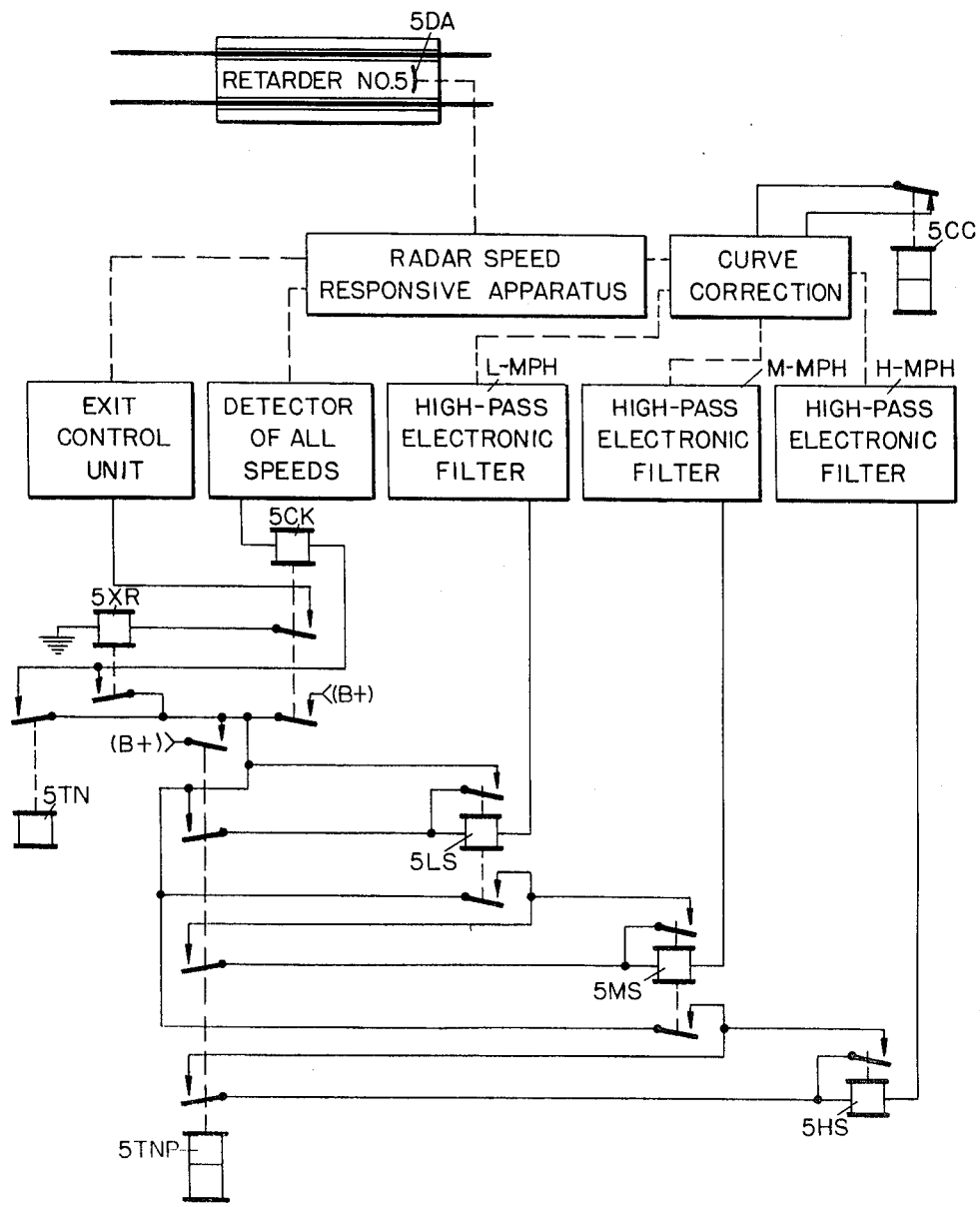
Figure 9:
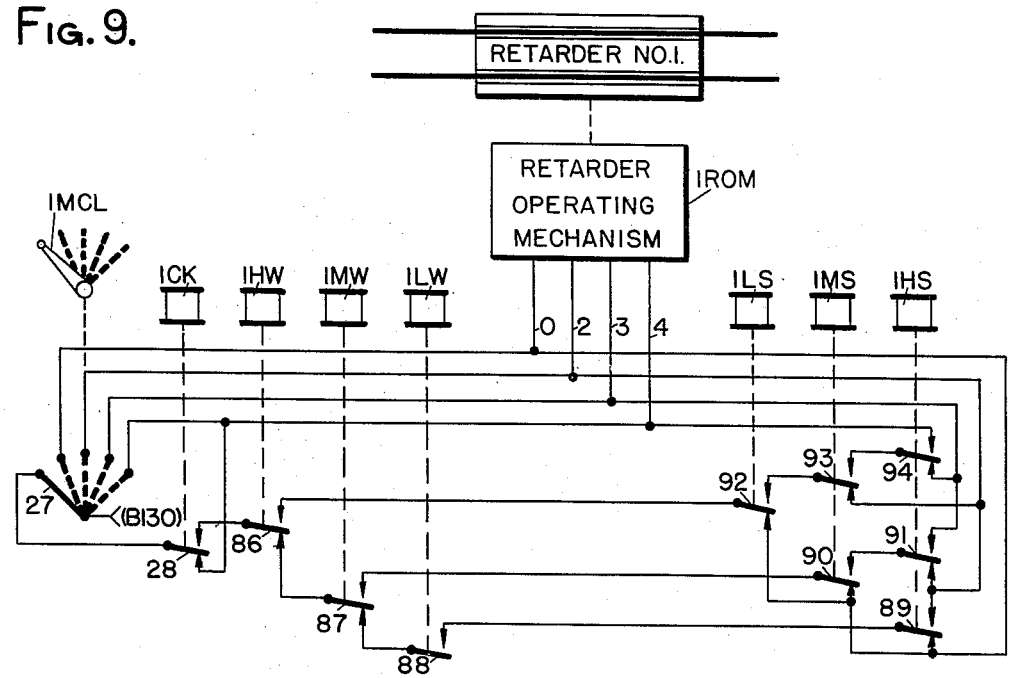
Figure 10:
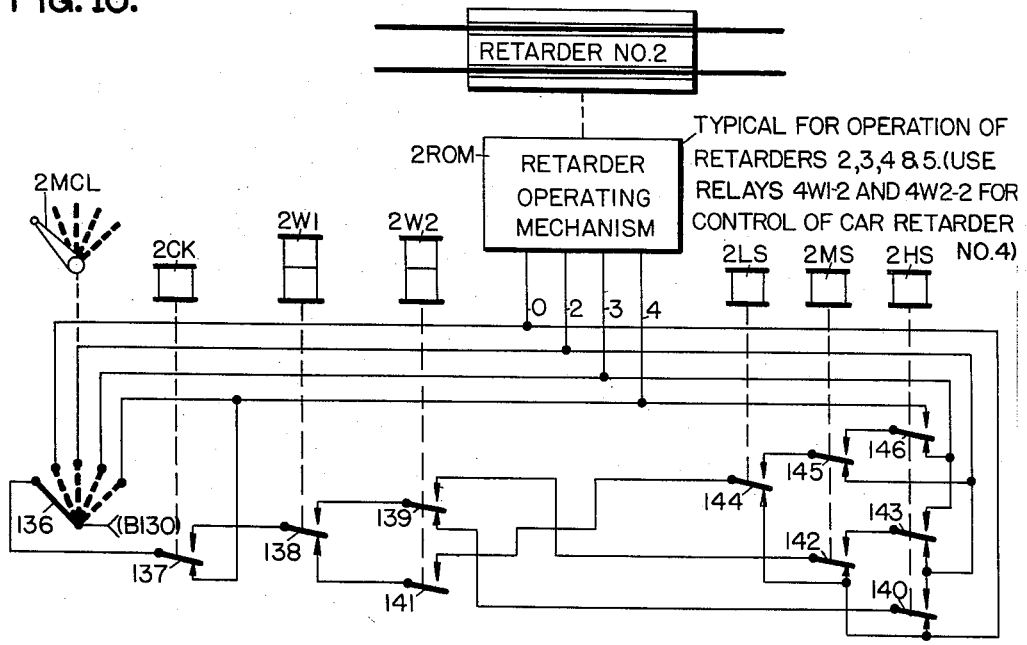
Figure 12A:
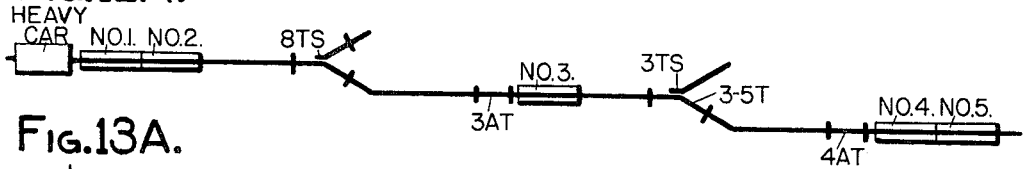
Figure 13A:

FIGS. 3A to 3G inclusive illustrate schematically the organization for one embodiment of the present invention for the storage and transfer of weight and curve correction controls which are used in governing the positioning of the car retarders;

FIG. 4 illustrates schematically, and partially by block diagram, the manner in which speed control relays and certain special control relays are governed by radar speed responsive apparatus associated with car retarder No. 1;

FIG. 5 illustrates schematically, and partially by block diagram, the manner in which speed control relays and special control relays are governed by radar speed responsive apparatus associated with car retarder No. 2;

FIG. 6 illustrates schematically, and partially by block diagram, the manner in which speed control relays and special control relays are governed by radar speed responsive apparatus associated with car retarder No. 3;

FIG. 7 illustrates schematically, and partially by block diagram, the manner in which speed control relays and special control relays are governed by speed responsive apparatus associated with car retarder No. 4;

FIG. 8 illustrates schematically, and partially by block diagram, the manner in which speed control relays and special control relays are governed by radar speed responsive apparatus associated with car retarder No. 5;

FIG. 9 illustrates car retarder control circuits provided for the control of car retarder No. 1;

FIG. 10 illustrates car retarder control circuits provided for the control of car retarder No. 2. These circuits are also typical of circuits provided for the control of car retarders Nos. 3, 4, and 5;

FIG. 11 illustrates a system for the control of a curve description relay in accordance with automatic switching route description;

FIGS. 12A to 12S inclusive (except that there is no FIGS. 12I and 12O) illustrate by track diagram the progress of a car from the hump to a classification track; and FIGS. 13A to 13S inclusive (except that there is no FIGS. 13I and 13O) are sequence charts illustrating the mode of operation of the control apparatus for respective stages of progress of a car to a classification track according to the track diagrams of FIGS. 12A through 12S inclusive; and FIG. 14 illustrates a system of cancellation.

For the purpose of simplifying the illustrations and facilitating in the explanation of the invention, the various parts and circuits constituting the embodiment of the invention have been shown diagrammatically and conventional illustrations have been employed, the drawings having been organized more with the purpose of facilitating the understanding of the principles and mode of operation of the invention, than with the idea of illustrating the specific construction and arrangement of parts that would be employed in practice. The symbols (+) and (−) are employed to indicate connections to the positive and negative terminals of suitable batteries or other sources of direct current and the symbol (B+) is used to indicate connection to the positive terminal of a high voltage power supply used in the radar equipment employed, the negative terminal of this power supply being assumed to be connected to ground.

Figure 1:
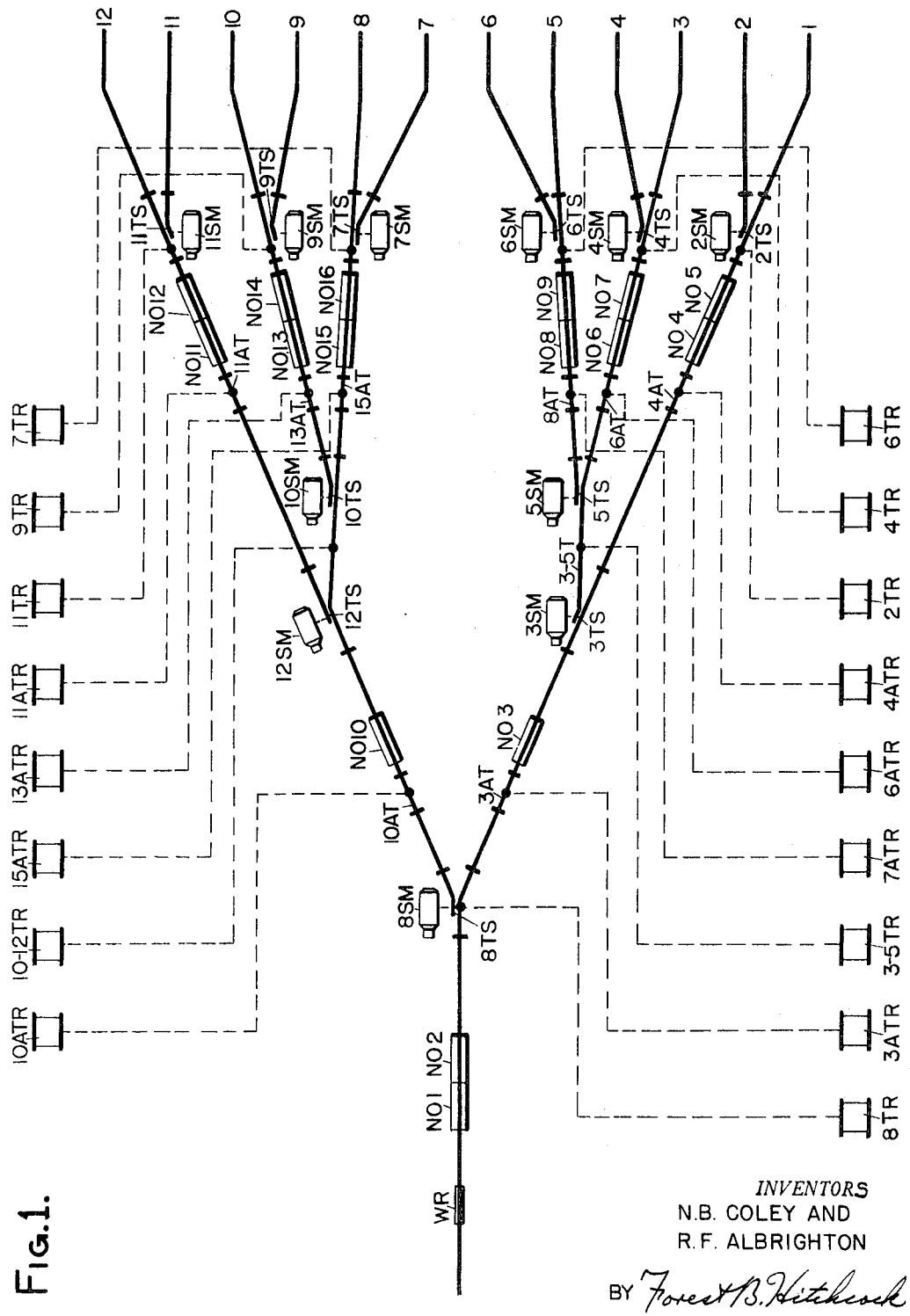
FIG. 1 is a typical track layout to which the present embodiment of the invention is applied.

With reference to FIG. 1, the track layout for which the system according to the present invention is assumed to be provided has twelve classification tracks which are fed with cars from a hump. The stretch of track extending from the hump includes a weighing rail WR and car retarders numbered 1 and 2. A junction switch 8TS is the first switch to be encountered by a car progressing from the hump, and this switch is operated by a suitable switch machine 8SM. Beyond the track switch 8TS are intermediate car retarders, the car retarder No. 3 being provided for the stretch of track selected by the track switch 8TS in its normal position. The next track switches are lap switches 3TS and 5TS for one leg of the layout and 12TS and 10TS for the other leg. These track switches are operated by power switch machines SM according to the usual practice. Beyond the lap switches, car retarders are provided which are known as group retarders which includes car retarders Nos. 4 and 5 which are used in braking a car if the car is progressing to track 1 or to track 2. The track switches 2TS, 4TS, 6TS, 7TS, 9TS and 11TS select the particular classification tracks for cars after passing through the group retarders.

According to actual practice, the track layout of a hump classification yard generally includes a much greater number of tracks, and it is to be understood that the simplified yard layout of the present embodiment as shown in FIG. 1 is selected to facilitate the disclosure of the invention, and that the system herein disclosed is readily adaptable for use in larger track layouts. These larger tracks layout generally have 8 classification tracks that are fed from each track lead extending through group car retarders rather than having just 2 classification tracks as is illustrated in FIG. 1.

With reference to FIG. 2, a suitable control panel P1 is provided for an operator supervising the passage of cars through the car retarders so that he may have manual control of the car retarders if he so desires at any time, there being a manual car retarder control lever MCL provided on the control panel for each of the car retarders. Each of these manual control levers has five positions, the left-hand position being the one normally used which selects automatic operation of the car retarders, the next right-hand position being used for operating the car retarders manually to open positions, the next right-hand position being for providing light retardation, the next right-hand position being for providing medium retardation, and the next right-hand operated position being for providing heavy retardation.

The car retarders CRM of FIG. 1 may be of any suitable type, such as is disclosed, for example, in the patent to W. K. Howe, No. 1,852,572, dated April 5, 1932.

A car retarder operating mechanism ROM (see FIGS. 9 and 10) is illustrated as being provided for each car retarder for governing the degree of retardation to be applied by the car retarder mechanism CRM. This car retarder operating mechanism selectively operates the car retarder CRM to four different positions in accordance with the application of energy to the respective wires 0, 2, 3 and 4 of FIGS. 9 and 10. These positions of the car retarder are respectively open, light braking, medium braking, and heavy braking. Although any suitable operating mechanism may be employed for operating the car retarder to these different positions, a control system such as is disclosed in the patent to W. K. Howe, No. 2,038,112, dated April 21, 1936, may be employed.

A weighing mechanism WD (see FIG. 3A) is associated with a weighing rail WR at the entrance end of car retarder No. 1 in a manner to weigh the load applied to the respective right-hand wheels of the cars as the cars approach the first of the hump car retarders, and thereby feeds information to the system for use in determining the degree of retardation that may be required. The structure and organization of the weighing rail WR and the weighing mechanism WD may be of any suitable type, the weighing rail WR being disposed adjacent the main rail of the trackway so that the rim of each car wheel rides up onto the weighing rail and thereby causes actuation of the weighing mechanism WD. The weighing mechanism WD is illustrated as having an axially operable shaft 20 carrying a compression spring 21 and a contacting plunger 22 which selectively makes contact between a common contact finger 30 and respective light weight, medium weight, and heavy weight indicating contact fingers 31, 37 and 39 respectively.

At the exit end of each of the car retarders, is a directional antenna DA which is connected to suitable radar speed responsive apparatus as is shown in FIGS. 4, 5, 6, 7 and 8. This radar speed responsive apparatus is assumed to be of the continuous wave radar type employing the Doppler frequency principle discussed in general terms in Chapter 5 of the book entitled "Radar System Engineering" edited by Lewis N. Ridenour and constituting volume I of the Radiation Laboratory Series published by the McGraw-Hill Book Company of New York. This radar speed responsive apparatus is sometimes called an "interferometer."

Speed indicating relays LS, MS and HS are provided for each interferometer for indicating relative low, medium and high speeds of cars progressing within a speed range requiring retardation. These relays are controlled through high pass electronic filters L-MPH, M-MPH and H-MPH respectively. By this system of control, the low speed relay LS is energized whenever the medium speed relay MS is picked up for the associated interferometer, and the medium speed relay MS is energized whenever the high speed relay HS is picked up for the associated interferometer. The low speed relays LS are not picked up at all low speeds, but rather at a low speed in the speed range in which retardation should be called for. In other words, each of the low speed relays LS becomes picked up only when the speed of the car being indicated is high enough to require retardation. The interferometer output governing the speed relays S can be adjusted so as to cause the speed relays to operate at different desired speeds for different car retarders.

An exit relay XR is associated with each of the interferometers in a manner to be picked up only upon the reception of a relatively strong signal. This occurs when a car is within substantially ten feet, for example, of the directional antenna DA for the associated interferometer. The exit relays XR have associated therewith exit repeater relays XP.

A check relay CK is associated with each of the interferometers in a manner to be picked up only in response to that interferometer detecting the presence of a car in motion at any speed.

Several banks of weight relays W are provided for storing the weights indicated by the actuation of the weighing mechanism WD for the different cars as they progress to their classification tracks. The relays 1LW, 1MW, and 1HW are the weight relays that are directly governed by the weighing mechanism WD, while the relays W1 and W2 for the different storage units are provided for storing weight information that is transferred from one storage unit to another as each associated car progresses.

Transfer relays TN and TNP are provided for the different weight storage units to govern the transfer of weight storages.

Detector track circuits are provided for the track switches according to usual practice. Each of these track circuits has a normally energized track relay TR, and back contact track repeater relays TP and TPP are provided for each of the track circuits. Switch position repeater relays NWP and RWP are provided for the various track switches for selecting the circuits for transfer of weight storage in accordance with the route the associated car is to take.

Short approach track circuits including track relays TR are provided for the intermediate car retarders and for the first car retarder of each of the group retarders, particularly for the purpose of governing the energization of the check relays CK and the speed relays S so as to prevent the response of these relays prematurely, and perhaps in response to the passage of a car over a different route.

Having considered the general organization of the system, more detail consideration of the organization will be given upon consideration of the mode of operation of the system under typical operating condition.

*Operation*

The condition of the apparatus illustrated is that which the apparatus assumes when there are no cars within the vicinity of the car retarders. The manual control levers MCL are illustrated as being normally in their left-hand positions, which selects the automatic control of the car retarders.

The car retarders are normally closed as selected by the associated check relays CK being in their dropped away positions. Thus the car retarder No. 1 (see FIG. 9) is closed normally in position for heavy retardation in accordance with the application of energy to wire No. 4 through contact 27 of lever 1MCL in its automatic position and back contact 28 of relay 1CK. A corresponding circuit is illustrated in FIG. 10 as being typical for the control of car retarders Nos. 2, 3, 4, and 5. It is to be understood that all intermediate car retarders are controlled similar to car retarder No. 2, and that all group car retarders are controlled similar to car retarders Nos. 4 and 5.

To consider specifically the circuit organization and mode of operation upon passage of a car, it will be assumed that a car is released at the hump and that such car actuates the weighing rail WR.

If this car is light, the relay 1LW (see FIG. 3A) is picked up by the energization of a circuit extending from (+), including back contact 29 of relay 1XP, contact fingers 30 and 31 and plunger 22 of the weight detector WD, back contact 32 of relay 1MW, back contact 33 of relay 1HW, and winding of relay 1LW, to (−). This relay when picked up is maintained energized by a stick circuit extending from (+), including back contact 29 of relay 1XP, back contact 34 of relay 1HW, back contact 35 of relay 1MW, front contact 36 of relay 1LW, and winding of relay 1LW, to (−).

If the car actuating the weighing device WD is of medium weight, the relay 1MW is picked up by the energization of a circuit extending from (+), including back contact 29 of relay 1XP, contact fingers 30 and 37 and plunger 22 of the weighing device WD, back contact 38 of relay 1HW, and winding of relay 1MW, to (−). This relay when picked up is maintained energized by a stick circuit extending from (+), including back contact 29 of relay 1XP, back contact 34 of relay 1HW, front contact 35 of relay 1MW, and winding of relay 1MW, to (−).

If the weighing device WD is actuated by a heavy weight car, relay 1HW is picked up by the energization of a circuit extending from (+), including back contact 29 of relay 1XP, contact fingers 30 and 39 and plunger 22 of the weighing device WD, and winding of relay 1HW, to (−). A stick circuit is closed upon the picking up of relay 1HW extending from (+), including front contact 29 of relay 1XP, front contact 34 of relay 1HW, and winding of relay 1HW, to (−).

In response to the picking up of any one of the weight relays 1LW, 1MW or 1HW, relay 1TNP becomes picked up by the energization of a circuit extending from (+), including back contact 40 of relay 1CK, front contacts 41, 42 and 43 of relays 1LW, 1MW and 1HW connected in multiple and upper winding of relay 1TNP, to (−). This relay when picked up is maintained energized until retardation is called for by the selective energization of the speed relays S. Thus stick energy is applied for relay 1TNP through back contact 44 of relay 1LS, front contact 45 of relay 1HW, and front contact 46 of relay 1TNP. If the medium weight relay is picked up, a stick circuit is provided for relay 1TNP through back contact 47 of relay 1MS, front contact 48 of relay 1MW, and front contact 46 of relay 1TNP. If the light weight relay 1LW is picked up, the stick circuit for relay 1TNP includes back contact 49 of relay 1HS, front contact 50 of relay 1LW, and front contact 46 of relay 1TNP.

Upon the picking up of relay 1TNP, a pick-up circuit is closed for the check relay 1CK (see FIG. 4). This relay is picked up in accordance with the radar speed responsive apparatus detecting the movement of the car with the provision that one of the weight relays 1LW, 1MW or 1HW must be picked up and the relay 1TNP must be picked up. Thus, the relay 1CK is picked up by energy feeding from the high voltage supply designated as (B+) through front contact 51 of relay 1LW or front contact 52 of relay 1MW or front contact 53 of relay 1HW and front contact 54 of relay 1TNP and back contact 55 of relay 1XP. Upon the picking up of relay 1CK, a stick circuit is provided for this relay including front contact 56 of relay 1CK and back contact 55 of relay 1XP connected in multiple with front contact 57 of relay 1XR.

If the speed of the car is sufficient to cause energy to pass through the high pass electronic filter L–MPH, relay 1LS becomes energized upon the picking up of relay 1TNP by a circuit including front contact 51 of relay 1LW or front contact 52 of relay 1MW or front contact 53 of relay 1HW and front contacts 54 and 58 of relay 1TNP. Upon the picking up of relay 1LS, and when relay 1CK is picked up, stick energy is applied to the winding of relay 1LS through front contact 56 of relay 1CK and front contact 59 of relay 1LS.

If the car approaching car retarder No. 1 is moving at a medium speed, the relay 1LS is picked up as has been described, and also the relay 1MS is picked up because of energy being passed by the high pass electronic filter M–MPH in accordance with the medium speed of a car. Under these conditions, the relay 1MS is picked up by energy feeding through front contact 51 of relay 1LW or front contact 52 of relay 1MW or front contact 53 of relay 1HW and front contact 54 of relay 1TNP, front contact 60 of relay 1LS, and front contact 61 of relay 1TNP. Front contact 62 of relay 1HW is connected in multiple with front contact 61 of relay 1TNP for purposes to be more readily apparent as the description of the invention progresses. Stick energy is provided for relay 1MS when relay 1CK is picked up through front contact 56 of relay 1CK, front contact 60 of relay 1LS, and front contact 63 of relay 1MS.

If the car approaching car retarder No. 1 is travelling at relatively high speed, the relays 1LW and 1MS are picked up as has been described, and in addition, energy is applied through the high pass electronic filter H–MPH to cause the picking up of relay 1HS in response to the picking up of relay 1TNP. Energy for the energization of relay 1HS is applied through front contact 51 of relay 1LW or front contact 52 of relay 1MW or front contact 53 of relay 1HW and front contact 54 of relay 1TNP, front contact 64 of relay 1MS, and front contact 65 of relay 1TNP. Front contact 66 is connected in multiple with front contact 65 of relay 1TNP for purposes to be more readily apparent as the description of the invention progresses. Relay 1HS is maintained picked up upon the picking up of relay 1CK by a stick circuit including front contact 56 of relay 1CK, front contact 64 of relay 1MS, and front contact 67 of relay 1HS.

Upon the picking up one of the weight relays 1LW, 1MW or 1HW, the transfer relay 2TN (see FIG. 3B) which governs transfer to the weight storage relays for car retarder No. 2 is picked up, provided that there is no weight storage for car retarder No. 2 at this time. The circuit by which relay 2TN is energized extends from (+), including front contacts 68, 69 and 70 of relays 1LW, 1MW and 1HW respectively (see FIG. 3A) connected in multiple, back contact 71 of relay 1XP connected in multiple with front contact 72 of relay 1XR, wire 299, back contact 73 of relay 2CK, back contacts 74, 75 and 76 of relays 2W2, 2W1 and 2TNP respectively and winding of relay 2TN, to (−). The picking up of this relay closes a stick circuit at front contact 77 shunting contacts 73, 74, 75 and 76 out of the circuit for the relay 2TN.

When relay 2TN is picked up, the weight storage relays 2W1 and 2W2 become energized in accordance with the weight storage as set up in the relays 1LW, 1MW and 1HW. Thus, if it is a light weight car that is registered by the relay 1LW being in its picked up position, relay 2W1 is picked up by the energization of a circuit extending from (+), including front contact 79 of relay 1LW (see FIG. 3A), wire 300, front contact 80 of relay 2TN (see FIG. 3B), and lower winding of relay 2W1, to (−). The upper winding of relay 2W1 is shunted through front contact 81 to provide slow drop away characteristics for this relay.

If the relay 1MW is picked up in accordance with the weighing of a medium weight car, the relays 2W1 and 2W2 are both picked up upon the picking up of the transfer relay 2TN. Relay 2W1 is picked up by the energization of a circuit extending from (+), including front contact 83 (see FIG. 3A), back contact 78 of relay 1HW, back contact 79 of relay 1LW, wire 300, front contact 80 of relay 2TN, and lower winding of relay 2W1, to (−). Relay 2W2 is picked up by the energization of a circuit extending from (+), including front contact 83 of relay 1MW, wire 303, front contact 84 of relay 2TN, and lower winding of relay 2W2, to (−). Relay 2W2 has its upper winding shunted by front contact 85 to make this relay slow in dropping away.

If relay 1HW (see FIG. 3A) is picked up because of the weighing of a heavy car, upon the picking up of relay 2TN (see FIG. 3B), only relay 2W2 is picked up. The pick up circuit for relay 2W2 under these conditions extends from (+), including front contact 78 of relay 1HW (see FIG. 3A), wire 303, front contact 84 of relay 2TN, and lower winding of relay 2W2, to (−).

In accordance with the picking up of one or more of the speed relays S associated with car retarder No. 1 (see FIG. 9), the control wires 0, 2, 3, and 4 become selectively energized in accordance with the combination of weight of the car as indicated by the condition of the weight relays 1HW, 1MW, and 1LW and in consideration of which ones of the speed relays 1LS, 1MS, and 1HS is picked up.

If the car approaching car retarder No. 1 is a light weight car and proceeding at a speed to cause only the energization of relay 1LS of the speed relays, this combination calls for no retardation, and thus energy is applied to wire No. 0 to cause the opening of the brake shoes of the car retarder No. 1. It will be noted that energy has been removed from wire No. 4 at back contact 28 of relay 1CK by the picking up of this relay. The circuit by which energy is applied to the wire No. 0 includes contact 27 of lever 1MCL, front contact 28 of relay 1CK, back contact 86 of relay 1HW, back contact 87 of relay 1MW, front contact 88 of relay 1LW, and back contact 89 of relay 1HS. It will be noted that this same circuit is closed even if the light weight car is proceeding at medium speed so as to cause the relay 1MS to be picked up. If the light weight car is travelling at high speed, however, energy is applied to wire No. 2 for operation of the brake shoes of car retarder No. 1 to a light braking position. The circuit by which energy is applied to wire No. 2 includes contact 27 of lever 1MCL, front contact 28 of relay 1CK, back contact 86 of relay 1HW, back contact 87 of relay 1MW, front contact 88 of relay 1LW, and front contact 89 of relay 1HW.

If it is a medium weight car that is approaching car retarder No. 1 at a speed to cause the energization of only the relay 1LS, energy is applied to wire No. 0 to cause the opening of the brake shoes of the car retarder through contact 27 of lever 1MCL, front contact 28 of relay 1CK, back contact 86 of relay 1HW, front contact 87 of relay 1MW, and back contact 90 of relay 1MS.

If a medium weight car is travelling at a medium speed so as to cause relay 1MS to be picked up, but not relay 1HS, energy is applied to wire No. 2 for operating the mechanism of car retarder No. 1 to a light braking position. The circuit by which wire No. 2 is energized includes contact 27 of lever 1MCL, front contact 28 of relay 1CK, back contact 86 of relay 1HW, front contact 87 of relay 1MW, front contact 90 of relay 1MS, and back contact 91 of relay 1HS.

If a medium weight car is approaching car retarder No. 1 at a relatively high speed so as to cause all of the speed relays S to be picked up, the mechanism of the car retarder is operated to a medium braking position by application of energy to wire No. 3 through contact 27 of lever 1MCL, front contact 28 of relay 1CK, back contact 86 of relay 1HW, front contact 87 of relay 1MW, front contact 90 of relay 1MS, and front contact 91 of relay 1HS.

If a heavy weight car is approaching car retarder No. 1 at a speed to cause the energization of only the relay 1LS, the brake shoes of the car retarder are operated to a light braking position by application of energy to wire No. 2. Energy is applied to wire No. 2 through contact 27 of lever 1MCL, front contact 28 of relay 1CK, front contact 86 of relay 1HW, front contact 92 of relay 1LS, and back contact 93 of relay 1MS.

If a heavy weight car is approaching car retarder No. 1 at a speed to cause the picking up of both relays 1LS and 1MS, but not relay 1HS, the mechanism of the car retarder is actuated to a medium braking position by application of energy to wire No. 3 through contact 27 of lever 1MCL, front contact 28 of relay 1CK, front contact 86 of relay 1HW, front contact 92 of relay 1LS, front contact 93 of relay 1MS, and back contact 94 of relay 1HS.

If a heavy weight car is approaching car retarder No. 1 at a speed to cause this picking up of relays 1LS, 1MS, and 1HS, the mechanism of the car retarder is actuated to a heavy braking position by application of energy to wire No. 4 through contact 27 of lever 1MCL, front contact 28 of relay 1CK, front contact 86 of relay 1HW, front contact 92 of relay 1LS, front contact 93 of relay 1MS, and front contact 94 of relay 1HS.

In accordance with retardation being called for by the particular combination of weight and speed relays that have been picked up, one or the other of the stick circuits that have been described for the relay 1TNP (see FIG. 3A) is opened to cause the dropping away of that relay. Relay 1TNP is made slow to drop away by the shunting of its lower winding through front contact 46 by the condenser 95.

The dropping away of relay 1TNP provides a feature conveniently called "single shot" operation in that once retardation has been applied to a car, it cannot be applied a second time to the same car in case the car should accelerate after the car retarder has been opened. This is desirable in that it saves unnecessary operations and thus prevents unnecessary wear on the car retarder and operating mechanism. Relay 1TNP accomplishes this feature by opening the pick-up circuits for relays 1LS, 1MS, and 1HS at front contacts 58, 61, and 65 respectively (see FIG. 4).

It will be noted that after braking pressure has been reduced by a car retarder, for a medium or heavy weight car, pressure can be increased under certain conditions in accordance with an increase in speed even though the associated "single shot" relay TNP has been dropped away. For example, if the braking pressure of car retarder No. 1 has been reduced for a medium weight car in accordance with a reduction in speed to cause the release of relay 1HS (see FIG. 4), and this car starts to accelerate, relay 1HS can again be picked up through front contact 66 of relay 1MW, and thereby increase the braking pressure. A similar mode of operation is provided for a heavy weight car with respect to the control of relay 1MS through front contact 62 of relay 1HW.

Figure 12B:
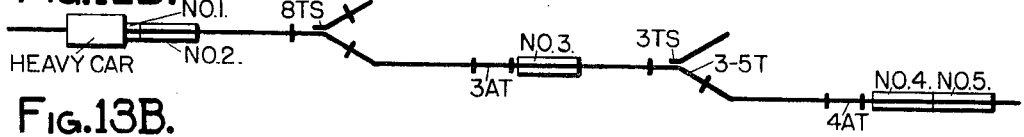
Figure 13B:

As a car progresses within car retarder No. 1 to a position as indicated in the diagram of FIG. 12B, the exit relay 1XR (see FIG. 4) of the interferometer for the associated car retarder is picked up. Relay 1XR is energized at this time through back contact 96 of relay 1XP and front contact 98 of relay 1CK. When relay 1XR is picked up, the closure of its front contact 99 shunts contact 96 out of its control circuit.

Upon the picking up of relay 1XR, its repeater relay 1XP (see FIG. 3A) is picked up by the energization of an obvious circuit for its lower winding through front contact 100 of relay 1XR. Relay 1XR when picked up is maintained energized as long as the check relay 1CK or either of the weight relays 1LW, 1MW, or 1HW is picked up. Thus, energy is fed to the lower winding of relay 1XP through front contact 101 of relay 1XP by front contacts 102, 103, 104, and 105 of relays 1CK, 1LW, 1MW and 1HW respectively connected in multiple.

The picking up of the exit relay 1XR associated with car retarder No. 1 causes the picking up of the transfer repeater relay 2TNP (see FIG. 3B) which is associated with car retarder No. 2. The pick-up circuit for relay 2TNP extends from (+), including front contact 106 of relay 1XR (see FIG. 3A), wire 298, back contact 107 of relay 2CK, front contact 108 of relay 2TN, front contacts 109 and 110 of relays 2W1 and 2W2 connected in multiple, and upper winding of relay 2TNP, to (−). This relay when picked up is maintained energized until a retarder application is called for by the weight and speed relays associated with the control of car retarder No. 2. If the weight stored is for a light car, a circuit is provided for relay 2TNP extending from (+), including back contact 111 of relay 2HS, back contact 112 of relay 2W2, front contact 113 of relay 2W1, front contact 114 of relay 2TNP, and lower winding of relay 2TNP, to (−). If the weight storage is for a medium weight car, relay 2TNP is maintained picked up by a stick circuit extending from (+), including back contact 115 of relay 2MS, front contact 112 of relay 2W2, front contact 113 of relay 2W1, front contact 114 of relay 2TNP, and lower winding of relay 2TNP, to (−). If the weight storage is for a heavy car, relay 2TNP is maintained picked up by a stick circuit extending from (+), including back contact 117 of relay 2LS, front contact 116 of relay 2W2, back contact 113 of relay 2W1, front contact 114 of relay 2TNP, and lower winding of relay 2TNP, to (−). Relay 2TNP is made slow to drop away by the condenser 118 which is shunted across its lower winding.

The picking up of relay 2TNP conditions the relays governed by the interferometer associated with car retarder No. 2 so that they may be picked up in accordance with the signals that are received by the radar speed responsive apparatus. Thus relay 2CK (see FIG. 5) becomes picked up at this time by the energization of a circuit including front contact 122 of relay 2TNP (see FIG. 5), connected in multiple with back contact 119 of relay 2TN, front contacts 301 and 302 of relays 2W1 and 2W2 connected in multiple, and back contact 120 of relay 2XP. Front contact 121 of relay 2XR is connected in multiple with back contact 120 of relay 2XP to govern the relay 2CK in a manner to be more readily apparent as the description progresses. The picking up of relay 2CK closes a stick circuit at front contact 123 to shunt contacts 119 and 122 out of the pick up circuits which have been described for relay 2CK.

If the car approaching car retarder No. 2 is travelling at a speed to cause the picking up of the relay 2LS, this relay becomes picked up in response to the energization of relay 2TNP by a circuit including front contact 122 of relay 2TNP, front contacts 301 and 302 of relays 2W1 and 2W2 connected in multiple, and front contact 124 of relay 2TNP. The picking up of this relap closes a stick circuit at front contact 125 to shunt front contact 124 of relay 2TNP out of the control circuit for relay 2LS, and the picking up of relay 2CK applies stick energy through front contact 123 to shunt contact 122 of relay 2TNP out of the control circuit for relay 2LS.

If the speed of the car approaching car retarder No. 2 is sufficient to cause the energization of relay 2MS, this relay becomes picked up in response to the picking up of relay 2LS by the energization of a circuit including front contact 122 of relay 2TNP, front contacts 301 and 302 of relays 2W1 and 2W2 connected in multiple, front contact 126 of relay 2LS, and front contact 127 of relay 2TNP. Relay 2MS is maintained picked up through front contact 123 of relay 2CK, front contact 126 of relay 2LS and front contact 128 of relay 2MS. It will be noted that the series connection of back contact 129 and front contact 130 of relays 2W1 and 2W2 respectively is included in the pick up circuit of relay 2MS in multiple with front contact 127 of relay 2TNP for purposes to be more readily apparent as the description of the invention progresses.

Relay 2MS, when picked up, conditions a pick up circuit for relay 2HS so that this relay can be picked up if the car approaching car retarder No 2 is approaching at relatively high speed. The pick up circuit for relay 2HS includes front contact 122 of relay 2TNP, front contacts 301 and 302 of relays 2W1 and 2W2 connected in multiple, front contact 131 of relay 2MS, and front contact 132 of relay 2TNP. Connected in multiple with front contact 132 of relay 2TNP is a circuit including front contact 133 of relay 2W1 and front contact 134 of relay 2W2 for reasons to be more readily apparent as the description of the invention progresses. Relay 2HS is provided with a stick circuit including front contact 123 of relay 2CK, front contact 131 of relay 2MS, and front contact 135 of relay 2HS.

If retardation is called for by the picking up of one or more of the speed relay 2LS, 2MS or 2HS, one of the stick circuits that has been described for relay 2TNP becomes opened to cause the dropping away of that relay. Relay 2TNP is made slow in dropping away as has been described to insure the full energization of the speed relays which are picked up through front contacts of relay 2TNP and to guard against the effects of relay flutter in the speed relays.

If a light weight car is approaching car retarder No. 2 at a speed not calling for the energization of relay 2HS, energy is applied to the No. 0 car retarder control wire (see FIG. 10) to cause the opening of the car retarder No. 2. This circuit includes contact 136 of lever 2MCL, front contact 137 of relay 2CK, front contact 138 of relay 2W1, back contact 139 of relay 2W2, and back contact 140 of relay 2HS. If the light car is proceeding at a speed to have caused the picking up of relay 2HS, the wire No. 2 becomes energized for operating the retarder mechanism to a light braking position. Wire No. 2 is energized through contact 136 of lever 2MCL, front contact 137 of relay 2CK, front contact 138 of relay 2W1, back contact 139 of relay 2W2, and front contact 140 of relay 2HS.

If it is a medium weight car that is approaching car retarder No. 2, and this car is approaching at such a speed as to permit the relays 2MS and 2HS to remain in their dropped away positions, energy is applied to wire No. 0 for opening the brake shoes of the car retarder through contact 136 of lever 2MCL, front contact 137 of relay 2CK, front contact 138 of relay 2W1, front contact 139 of relay 2W2, and back contact 142 of relay 2MS. If the speed of the medium weight car is such as to cause the relay 2MS to be picked up, energy is applied to wire No. 2 for operation of the car retarder mechanism to a light braking position through contact 136 of lever 2MCL, front contact 137 of relay 2CK, front contact 138 of relay 2W1, front contact 139 of relay 2W2, front contact 142 of relay 2MS, and back contact 143 of relay 2HS. If the medium weight car is proceeding at relatively high speed so as to cause all of the speed relays to be picked up, medium braking is applied to the car by the application of energy to wire No. 3 through contact 136 of lever 2MCL, front contact 137 of relay 2CK, front contact 138 of relay 2W1, front contact 139 of relay 2W2, front contact 142 of relay 2MS, and front contact 143 of relay 2HS.

If it is a heavy weight car that is approaching car retarder No. 2, weight relay 2W2 is picked up, and if the car is approaching at a speed such as to permit the relays 2MS, 2LS or 2HS to remain in their dropped away positions, energy is applied to wire No. 0 for opening the brake shoes of the car retarder through contact 136 of lever 2MCL, front contact 137 of relay 2CK, back contact 138 of relay 2W1, front contact 141 of relay 2W2, and back contact 144 of relay 2LS. If the heavy weight car is proceeding at a speed so as to cause the relay 2LS to be picked up but the relay 2MS and 2HS to remain dropped away, energy is applied to wire No. 2 to provide light braking through contact 136 of lever 2MCL, front contact 137 of relay 2CK, back contact 138 of relay 2W1, front contact 141 of relay 2W2, front contact 144 of relay 2LS, and back contact 145 of relay 2MS. If the speed of the heavy weight car is such as to cause the relays 2LS and 2MS to be picked up but the relay 2HS to remain in its dropped away position, medium braking is applied by the car retarder in accordance with the application of energy to control wire No. 3 through contact 136 of lever 2MCL, front contact 137 of relay 2CK, back contact 138 of relay 2W1, front contact 141 of relay 2W2, front contact 144 of relay 2LS, front contact 145 of relay 2MS, and back contact 146 of relay 2HS. If the heavy weight car is proceeding at a speed causing the relays 2LS, 2MS and 2HS to be all picked up, heavy braking is applied to the car in accordance with the application of energy to the control wire No. 4 through contact 136 of lever 2MCL, front contact 137 of relay 2CK, back contact 138 of relay 2W1, front contact 141 of relay 2W2, front contact 144 of relay 2LS, front contact 145 of relay 2MS, and front contact 146 of relay 2HS.

Figure 12C:
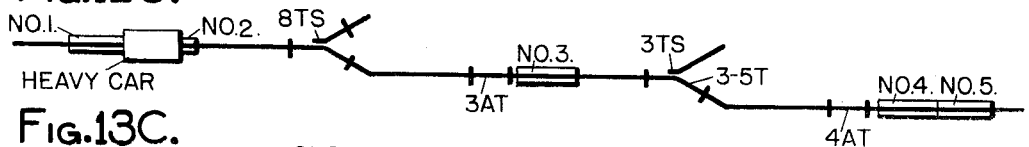
Figure 13C:
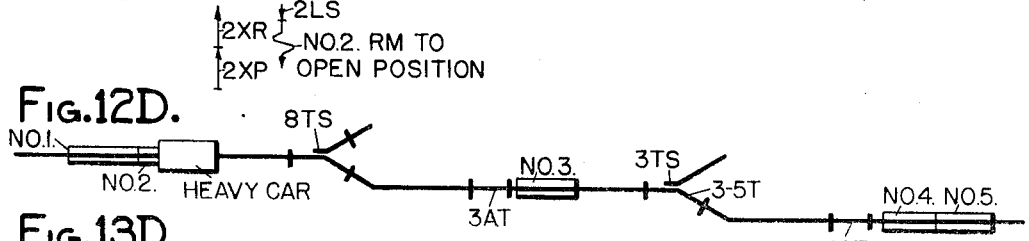

To consider further operation of the system, it will be assumed that a car progresses to a point close enough to the exit end of the car retarder No. 2 to cause the picking up to the exit relay 2XR (see FIG. 5) as is illustrated in FIGS. 12C and 13C. It is assumed that at this point the speed of the car has been reduced sufficiently to have caused the dropping away of all of the speed relays, the dropping away of relay 2LS being effective to cause the operation of the car retarder to its open position by energy feeding through back contacts of the speed relays.

The exit relay 2XR is picked up by the energization of a circuit comparable to that which has been described for the exit relay 1XR, and the picking up of this relay causes the picking up of relay 2XP (see FIG. 3B) by the energization of its lower winding through front contact 147. Relay 2XP is maintained picked up by a stick circuit extending through its front contact 148 to which energy is applied by front contacts 149, 150, and 151 of relays 2CK, 2W1, and 2W2 connected in multiple. Relay 2XP is made slow to drop away by the shunting of its upper winding through front contact 152.

Figure 12D:
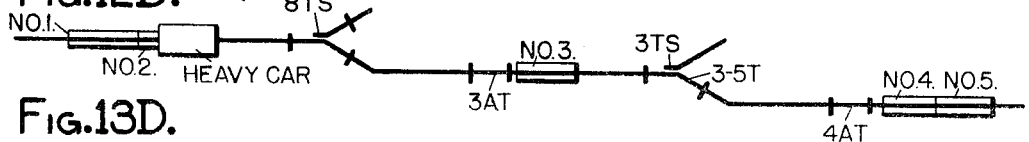
Figure 13D:

To consider operation upon further progress of a car, it will be assumed that the car progresses to the point illustrated in FIG. 12D so as to permit the exit relay 1XR associated with car retarder No. 1 to be dropped away. The dropping away of this relay opens the control circuit for relay 1CK at front contact 57 (see FIG. 4) so as to cause relay 1CK to be dropped away. The dropping away of relay 1XR also causes the dropping away of whichever of the weight relays 1LS, 1MS, or 1HS has been energized by the opening of front contact 153 (see FIG. 3A). Relay 1XR in dropping away also causes the dropping away of the transfer relay 2TN by the opening of the stick circuit for that relay at front contact 72.

The dropping away of relay 2TN closes stick circuits for the relays 2W1 and 2W2 (see FIG. 3B) in accordance with whichever one or both are energized. Thus, if the relay 2W1 is picked up, a stick circuit is closed for the lower winding of that relay extending from (+), including front contact 154 of relay 2XR connected in multiple with back contact 155 of relay 2XP, front contact 156 of relay 2W1, back contact 80 of relay 2TN, and lower winding of relay 2W1, to (−). If relay 2W2 is in its picked up position at this time, a stick circuit is closed for this relay extending from (+), including front contact 157 of relay 2XR connected in multiple with back contact 158 of relay 2XP, front contact 159 of relay 2W2, back contact 84 of relay 2TN, and lower winding of relay 2W2, to (−). It will be noted that the upper windings of the relays 2W1 and 2W2 are shunted as has been described so as to provide a crossover time holdover for the shifting of the contacts 80 and 84 respectively of relay 2TN to transfer from the pick up circuits to the stick circuits.

The dropping away of relay 1XR (see FIG. 3A) opens the pick up circuit for relay 1XP at front contact 100 and the stick circuit for this relay is opened upon the dropping away of whichever one of the weight relays 1LW, 1MW or 1HW is picked up. The shunting of the upper winding of relay 1XP through front contact 160 causes the relay 1XP to be sufficiently slow in dropping away to permit the restoration of all relays governed by the exit control before the relay 1XP is dropped away to close its back contacts 29 and 71 to restore certain parts of the system to their normal conditions.

Upon the dropping away of relay 2TN, the transfer relay 8TN (see FIG. 3C) becomes picked up to permit transfer of the weight storage for car retarder No. 2 to the weight storage relays 8W1 and 8W2 which are associated with the track switch 8W. The circuit by which the relay 8TN is picked up extends from (+), including back contact 161 of relay 2TN, front contact 162 of relay 2W1 connected in multiple with front contact 163 of relay 2W2, wire 304, back contact 164 of relay 8TPP, back contact 165 of relay 8W2, back contact 166 of relay 8W1, and winding of relay 8TN, to (−). The picking up of this relay closes a stick circuit at front contact 167 to shunt contacts 164, 165 and 166 out of the circuit just described.

The picking up of relay 8TN renders the transfer effective for the weight storage from the relays 2W1 and 2W2 which are associated wth car retarder No. 2 to the weight storage relays 8W1 and 8W2. If relay 2W1 is picked up, relay 8W1 becomes picked up upon the picking up of relay 8TN by the energization of a circuit extending from (+), including front contact 168 of relay 2W1 (see FIG. 3B), wire 305, front contact 169 of relay 8TN, back contact 170 of relay 8TPP, back contact 171 of relay 8RWP, wire 306, back contact 172 of relay 3TN-1, wire 307, and lower winding of relay 8W1, to (−). A multiple circuit through back contact 173 of relay 8NWP and back contact 174 of relay 10TN-1 is also closed at this time. Relay 8W1 is made slow to drop away by the shunting of its upper winding through front contact 175.

Relay 8W2 can be picked up in accordance with the energization of relay 2W2 upon the picking up of relay 8TN by the energization of a circuit extending from (+), including front contact 176 of relay 2W2 (see FIG. 3B), wire 308, front contact 177 of relay 8TN, back contact 178 of relay 8TPP, back contact 179 of relay 8RWP, wire 309, back contact 180 of relay 3TN-1, wire 310, and lower winding of relay 8W2, to (−). A similar multiple circuit is provided including back contact 181 of relay 8NWP and back contact 182 of relay 10TN-1. Relay 8W2 is made slow to drop away by the shunting of its upper winding through front contact 183.

Relays 8W1 and 8W2 are maintained picked up by stick circuits which are required after the weight relays 2W1 and 2W2 have been dropped away. The stick circuit for relay 8W1 extends from (+), including back contact 184 of relay 8TPP connected in multiple with front contact 185 of relay 8TP, front contact 186 of relay 8W1, back contact 171 of relay 8RWP, wire 306, back contact 172 of relay 3TN-1, wire 307, and lower winding of relay 8W1, to (−). Similarly, relay 8W2 is provided with a stick circuit extending from (+), including back contact 187 of relay 8TPP connected in multiple with front contact 188 of relay 8TP, front contact 189 of relay 8W2, back contact 179 of relay 8RWP, wire 309, back contact 180 of relay 3TN-1, wire 310, and lower winding of relay 8W2, to (−).

Considering the mode of operation upon further movement of a car, it will be assumed that a car leaves the car retarder No. 2 so as to permit the dropping away of the exit relay 2XR as is indicated in the track diagram of FIG. 12E and in the sequence chart of FIG. 12E.

The dropping away of relay 2XR does not immediately cause the dropping away of relay 2XP (see FIG. 3B) because this relay is maintained energized until the check relay 2CK and weight relays 2W1 and 2W2 are dropped away. Relay 2CK, however, is deenergized by the dropping away of the exit relay 2XR by the opening of its circuit at front contact 121 (see FIG. 5), and the weight relays 2W1 and 2W2 have their stick circuits opened at front contacts 154 and 157 respectively of relay 2XR.

Figure 3A:
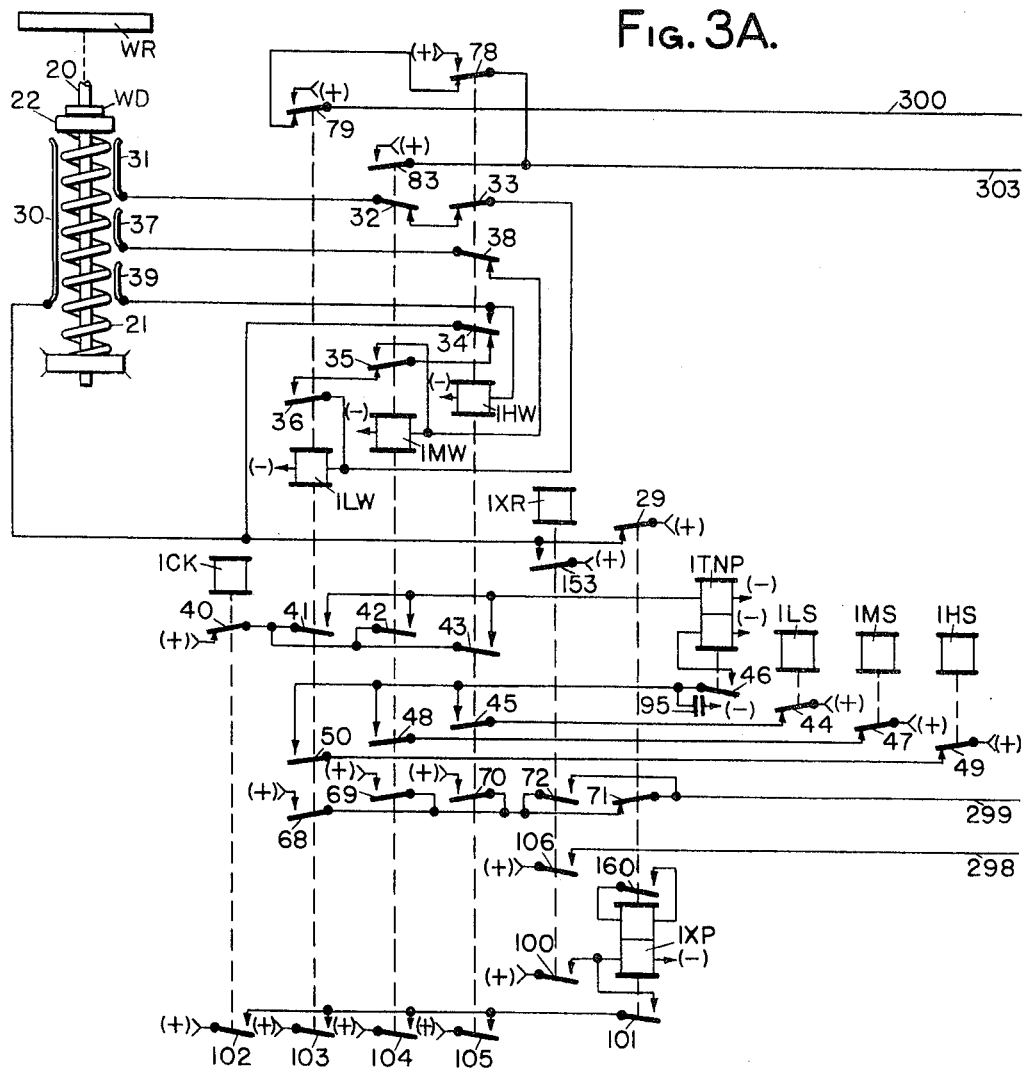
Figure 3B:
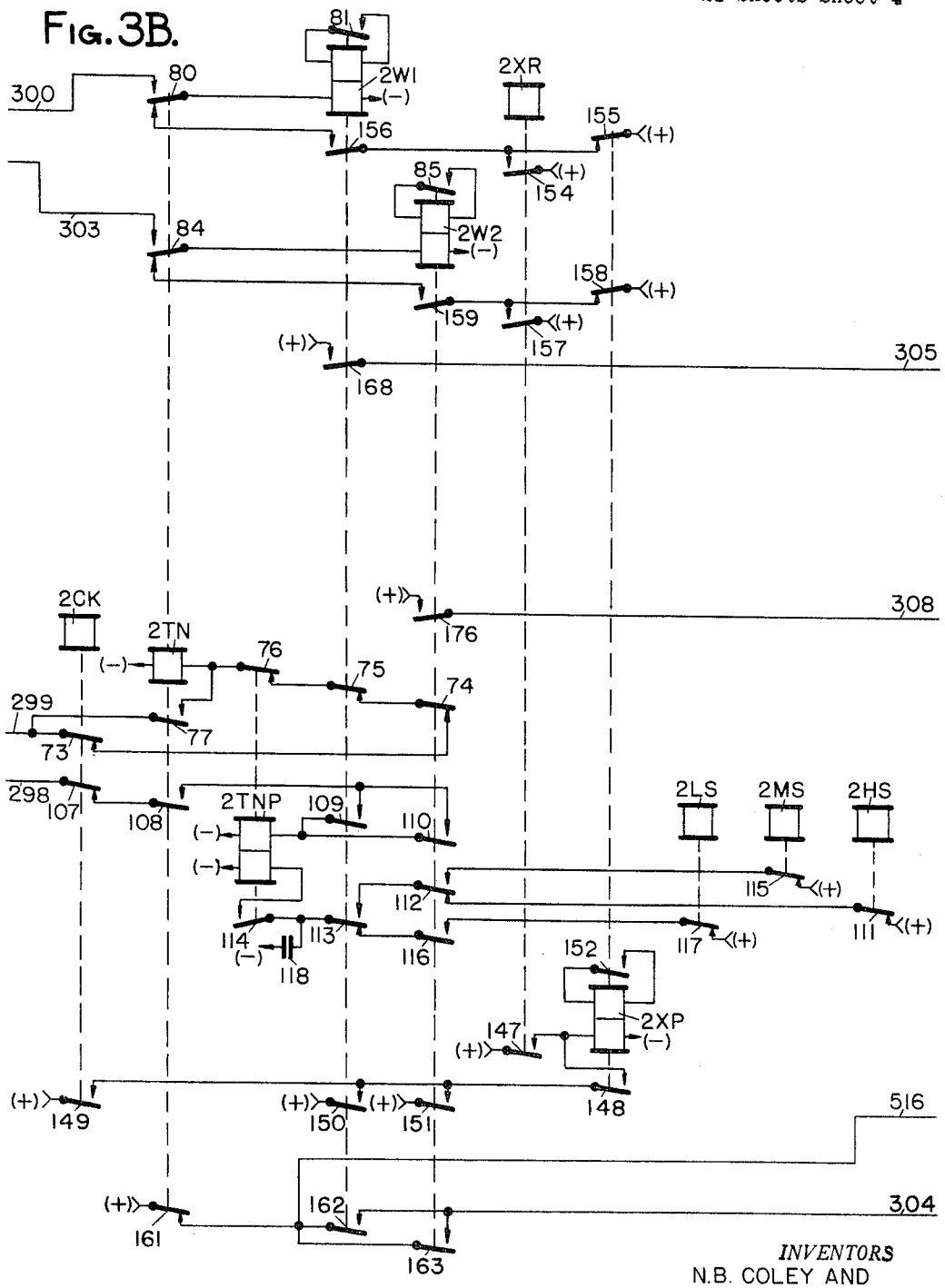

The dropping away of the weight relays W1 and W2 causes the dropping away of relay 2XP by the opening of its circuit at front contacts 150 and 151 respectively (see FIG. 3B).

The dropping away of the check relay 2CK is effective to cause the mechanism of the car retarder No. 2 to be operated to its normally biased closed position in accordance with the application of energy to wire No. 4 (see FIG. 10) through back contact 137 of relay 2CK.

The transfer relay 8TN is dropped away in accordance with the dropping away of the weight relays 2W1 and 2W2 by the opening of front contacts 162 and 163 (see FIG. 3B) respectively. Relays 8W1 and 8W2 are maintained energized, however, by their stick circuits that have been described, irrespective of the opening of their pick-up circuits at front contacts 169 and 177 respectively of relay 8TN.

For consideration of the next step in the operation upon passage of a car, it will be assumed that a car progresses to a point of occupancy of the detector track section 8T as is illustrated in FIG. 12F. In accordance with the entrance of the car into this track section, the sequence of operation of the relays takes place as is illustrated in FIG. 13F.

Upon the dropping away of relay 8TR, the back contact repeater relay 8TP (see FIG. 3C) is picked up upon the closure of back contact 190 of relay 8TR, and the picking up of relay 8TP causes the picking up of relay 8TPP by the energization of a circuit extending from (+), including back contact 191 of relay 8NWP, back contact 192 of relay 8RWP, front contact 193 of relay 8TP, front contact 194 of relay 8W2 connected in multiple with front contact 195 of relay 8W1, and winding of relay 8TPP, to (−). This relay when picked up is maintained energized by a stick circuit extending from (+), including front contact 196 of relay 8TN, front contact 197 of relay 8TPP, and winding of relay 8TPP, to (−).

The picking up of relay 8TPP renders the switch repeater relays 8NWP and 8RWP selectively responsive in accordance with the position of the track switch for the purpose of selecting the course of transfer of the weight description to correspond with the route the car is to take. In other words, when a car enters the detector track section, the position of the track switch has already been determined in accordance with the route the car is to take, and thus the switch repeater relay 8NWP or 8RWP that is energized at this time is truly indicative of the route of the car under consideration. If the track switch has been operated to its normal position, relay 8NWP is picked up by the energization of a circuit including front contact 198 of relay 8TPP and contact 199 of switch circuit controller 8WSC which is governed according to the operation of the switch points of the track switch 8TS. This relay when picked up is maintained energized by a stick circuit including front contact 200 of relay 8TP and front contact 201 of relay 8NWP. If the track switch 8TS is in its reversed position, the reverse repeater relay 8RWP is picked up by a circuit including front contact 202 of relay 8TPP and contact 199 of the circuit controller 8WSC. This relay when picked up is maintained energized through a stick circuit including front contact 200 of relay 8TP and front contact 203 of relay 8RWP.

The picking up of a switch position relay 8NWP or 8RWP provides a new stick circuit for each of the weight relays 8W1 and 8W2 in accordance with the route that has been selected. If relay 8W1 is picked up, and the route is with the track switch 8W in its normal position, a stick circuit is closed for this relay extending from (+), including back contact 184 of relay 8TPP connected in multiple with front contact 185 of relay 8TP, front contact 204 of relay 8W1, front contact 205 of relay 8NWP, wire 311, back contact 206 of relay 3W1-1, wire 307, and lower winding of relay 8W1, to (−). If the track switch 8TS is in its reverse position, the stick circuit for relay 8W1 extends from (+), including back contact 184 of relay 8TPP connected in multiple with front contact 185 of relay 8TP, front contact 204 of relay 8W1, front contact 207 of relay 8RWP, back contact 208 of relay 10W1-1, and lower winding of relay 8W1, to (−).

If relay 8W2 is in its picked up position at a time when a car enters track section 8T, and if the track switch 8TS is in its normal position, a stick circuit is closed for relay 8W2 extending from (+), including back contact 187 connected in multiple with front contact 188, front contact 209 of relay 8W2, front contact 210 of relay 8NWP, wire 312, back contact 211 of relay 3W2-1, wire 310, and lower winding of relay 8W2, to (−). If the relay 8RWP is picked up in accordance with the track switch 8TS being in its reverse position, the stick circuit for relay 8W2 extends from (+), including back contact 187 of relay 8TPP connected in multiple with front contact 188 of relay 8TP, front contact 209 of relay 8W2, front contact 212 of relay 8RWP, back contact 213 of relay 10W2-1 and lower winding of relay 8W2, to (−).

With one of the switch position repeater relays 8NWP or 8RWP picked up, a circuit is closed for the energization of the transfer relay 3TN-1 (see FIG. 3D) for the intermediate car retarder provided that the weight storage for that car retarder provided by relays 3W1-1 and 3W2-1 is not in use. The circuit by which relay 3TN-1 is picked up extends from (+), including front contacts 214 and 215 (see FIG. 3C) of relays 8W1 and 8W2 respectively connected in multiple, front contact 216 of relay 8TP, front contact 217 of relay 8TPP, front contact 218 of relay 8NWP, wire 313, back contact 219 of relay 3W2-1, back contact 220 of relay 3W1-1, and winding of relay 3TN-1, to (−). The picking up of this relay shunts back contacts 219 and 220 out of the circuit just described upon the closure of the stick contact 221. If the route for the car under consideration had been over the track switch in its reverse position, so as to cause the relay 8RWP to have been picked up rather than the relay 8NWP, a relay corresponding to relay 3TN-1, shown in block form as relay 10TN-1, would have been picked up by a circuit similar to that provided to relay 3TN-1 and selected through front contact 222 of relay 8RWP.

With the relay 3TN-1 picked up (assuming the route over the track switch 8TS in its normal position), the storage of weight by the energization of relay 8W1 is transferred to the relay 3W1-1 (see FIG. 3D) by the energization of a circuit extending from (+), including front contact 223 of relay 8W1 (see FIG. 3C), front contact 224 of relay 8NWP, wire 314, front contact 225 of relay 3TN-1, back contact 226 of relay 3TN-2 connected in multiple with front contact 227 of relay 3TNP, and lower winding of relay 3W1-1, to (−). The picking up of this relay closes a stick circuit extending from (+), including front contact 228 of relay 3W1-1, back contact 226 of relay 3TN-2 connected in multiple with front contact 227 of relay 3TNP, and lower winding of relay 3W1-1, to (−). Another stick circuit is closed for relay 3W1-1 extending from (+), including front contact 229 of relay 3W1-1, back contact 230 of relay 3W1-2, and lower winding of relay 3W1-1, to (−). Relay 3W1-1 is also provided with another stick circuit which becomes effective only when the car has proceeded to a point of picking up the relay 3CK. This stick extends from (+), including front contact 228 of relay 3W1-1, front contact 231 of relay 3CK, and lower winding of relay 3W1-1, to (−). Relay 3W1-1 is also made slow to drop away by the shunting of its upper winding through front contact 232. If the relay 8RWP is picked up rather than relay 8NWP because of the track switch 8TS being in its reverse position, a similar circuit organization is energized for the control of relay 10W1-1 (shown only in block form), this circuit being selected through front contact 233 of relay 8RWP.

If the weight is to be transferred from the weight relay 8W2 (see FIG. 3C), relay 3W2-1 becomes picked up by the energization of a circuit extending from (+), including front contact 234 of relay 8W2, front contact 235 of relay 8NWP, wire 315, front contact 236 of relay 3TN-1, back contact 237 of relay 3TN-2 connected in multiple with front contact 238 of relay 3TNP, and lower winding of relay 3W2-1, to (−). This relay when picked up closes a stick circuit extending from (+), including front contact 239 of relay 3W2-1, back contact 237 of relay 3TN-2 connected in multiple with front contact 238 of relay 3TNP and lower winding of relay 3W2-1, to (−). Another stick circuit is closed for relay 3W2-1 including front contact 240 of relay 3W2-1 and back contact 241 of relay 3W2-2. Another stick circuit becomes effective for relay 3W2-1 when the check relay 3CK becomes picked up upon the approach of the car to the immediate car retarder. This stick circuit extends from (+), including front contact 239 of relay 3W2-1, front contact 242 of relay 3CK, and lower winding of relay 3W2-1, to (−). Relay 3W2-1 is made slow to drop away by the shunting of its upper winding through front contact 243. In case the route is selected over the track switch 8TS in its reverse position, relay 8RWP (see FIG. 3C) is picked up rather than relay 8NWP and a similar circuit organization is provided for the energization of relay 10W2-1 (shown in block form), this relay being energized through front contact 244 of relay 8RWP.

The picking up of the relay 3W1-1 causes the dropping away of the relay 8W1 by opening the stick circuit for this relay at back contact 206. If the route would have been over the track switch 8TS in its reverse position, the circuit for relay 8W1 would have been opened by the picking up of relay 10W1-1 upon the opening of back contact 208. Similarly the relay 8W2 becomes dropped away when the relay 3W2-1 becomes picked up by the opening of back contact 211, and if the route is over the track switch 8TS in its reverse position, this relay becomes dropped away because of the opening of its stick circuit at back contact 213 of relay 10W2-1.

Relay 8TPP is maintained picked up subsequent to the energization of one of the switch repeater relays by a stick circuit extending from (+), including front contact 245 of relay 8TPP, front contacts 194 and 195 of relays 8W2 and 8W1 respectively connected in multiple and winding of relay 8TPP, to (−). When relays 8W1 and/or 8W2 are dropped away following the transfer of their weight storage to the relays 3W1-1 and 3W2-1, the relay 8TPP becomes deenergized by its stick circuit being opened at front contacts 194 and 195 of relays 8W2 and 8W1. Thus the relay 8TPP becomes dropped away at this time.

Energy is removed from the transfer relay 3TN-1 upon the dropping away of the weight storage relays 8W1 and 8W2 by the opening of front contacts 214 and 215 of these relays respectively, and when relay 3TN-1 becomes dropped away, a pick up circuit is closed for the transfer relay 3TN-2 to permit transfer of the weight storage to the relays 3W1-1 and 3W2-2 provided that there is no weight stored by these relays at this time. The circuit by which the relay 3TN-2 is energized extends from (+), including back contact 246 of relay 3TN-1, front contacts 247 and 248 of relays 3W1-1 and 3W2-1 respectively connected in multiple, back contact 249 of relay 3CK, back contact 250 of relay 3W2-2, back contact 251 of relay 3W1-2, back contact 252 of relay 3TNP, and lower winding of relay 3TN-2, to (−). A stick circuit is closed for relay 3TN-2 through front contact 254 of relay 3TN-2 and back contact 255 of relay 3XR. The upper winding of relay 3TN-2 is shunted through front contact 256 to make relay 3TN-2 slow in dropping away.

In accordance with the picking up of relay 3TN-2, the weight storage is transferred from the relays 3W1-1 and 3W2-1 to the relays 3W1-2 and 3W2-2. Thus, if relay 3W1-1 is in its picked up position at that time, relay 3W1-2 becomes energized by a circuit extending from (+), including front contact 228 of relay 3W1-1, back contact 231 of relay 3CK, front contact 257 of relay 3W1-1, front contact 258 of relay 3TN-2, back contact 259 of relay 3TNP and upper winding of relay 3W1-2, to (−). This relay when picked up is maintained energized by a stick circuit for its lower winding including the stick contact 260 and front contacts 261 and 262 of relays 3XR and 3TN-2 connected in multiple.

If the weight storage calls for the relay 3W2-1 to have been picked up, the relay 3W2-2 becomes picked up upon the energization of relay 3TN-2 by the energization of a circuit extending from (+), including front contact 239 of relay 3W2-1, back contact 242 of relay 3CK, front contact 263 of relay 3W2-1, front contact 264 of relay 3TN-2, back contact 265 of relay 3TNP, and upper winding of relay 3W2-2, to (−). This relay is maintained picked up by a stick circuit extending from (+), including front contact 266 of relay 3XR connected in multiple with front contact 267 of relay 3TN-2, front contact 268 of relay 3W2-2, and lower winding of relay 3W2-2, to (−).

When relay 3W1-2 becomes picked up, it causes the dropping away of relay 3W1-1 by opening its stick circuit at back contact 230; and similarly the picking up of relay 3W2-2 causes the dropping away of relay 3W2-1 by the opening of its circuit at back contact 241.

When the weight storage relays 3W1-1 and 3W2-1 are both dropped away, with the relay 3TN-2 picked up, a pick-up circuit is closed for the relay 3TNP extending from (+), including back contact 269 of relay 3W1-1, back contact 270 of relay 3W2-1, back contact 271 of relay 3CK, front contact 272 of relay 3TN-2 and winding of relay 3TNP, to (−). Relay 3TNP is maintained energized by a selected stick circuit until retardation is actually called for by circuits comparable to those which have been described in detail for the control of relay 2TNP (see FIG. 3B).

Figure 3C:
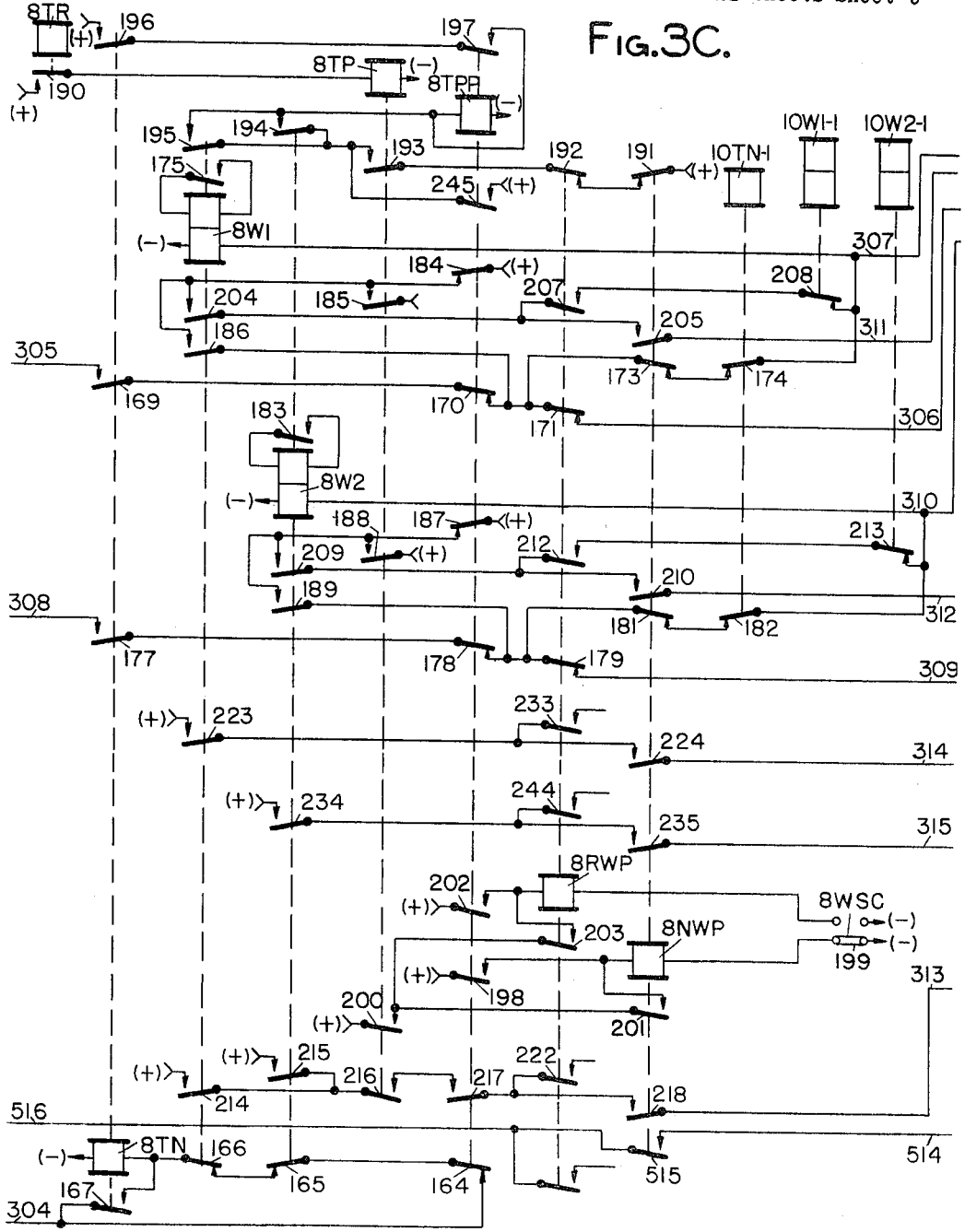

When the car which has been assumed to have entered the track section 8T leaves this detector track section as is illustrated in the diagram of FIG. 12G, relay 8TR becomes picked up and the picking up of this relay causes the dropping away of the back contact track repeater relay 8TP by the opening of back contact 190 (see FIG. 3C). The dropping away of relay 8TP opens the stick circuits for the switch repeater relays 8NWP and 8RWP at front contact 200 to effect the dropping away of whichever one of these relays has been energized.

Figure 12H:
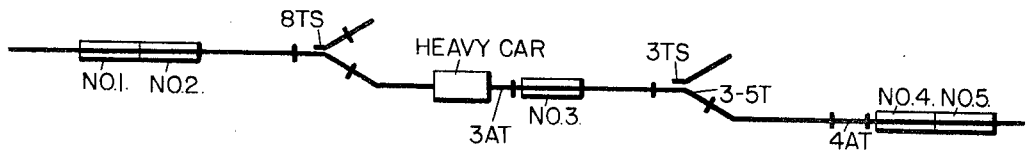
Figure 13H:
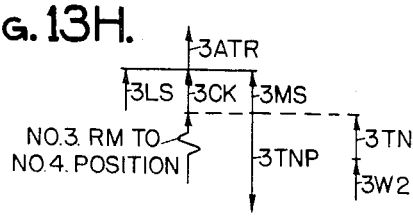
Figure 12J:
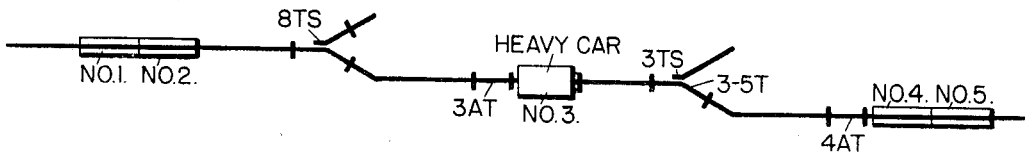
Figure 13J:
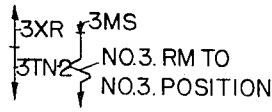

When the car enters the approach track section 3AT as is illustrated in FIG. 12H, the track relay 3ATR is picked up. With the car occupying the approach track section 3AT, the interferometer associated with car retarder No. 3 is rendered operable to cause the picking up of the check relay 3CK (see FIG. 6). This relay is energized through front contact 273 of relay 3ATR, front contact 274 of relay 3TNP, and front contact 275 of relay 3TN-2. Front contact 276 of relay 3XR is connected in multiple with front contact 275 of relay 3TN-2 to maintain the check relay 3CK energized when a car is leaving car retarder No. 3. Upon the picking up of relay 3CK, a stick circuit is closed at front contact 277 shunting front contacts 273 and 274 of relays 3ATR and 3TNP out of the circuit just described.

The speed relays 3LS, 3MS, and 3HS become subject to energization in accordance with the speed of the car upon the picking up of relay 3ATR, these relays being energized in a manner comparable to that which has been specifically described for the energization of similar relays by the interferometer associated with car retarder No. 2. The pick-up circuits for the relays 3LS, 3MS and 3HS are energized through front contacts 273 and 274 of relays 3ATR and 3TNP, until the picking up of the check relay 3CK, which applies energy to the circuits for the speed relays through front contact 277. Upon the energization of one or more of the speed relays, the car retarder No. 3 is operated to a position called for in accordance with the weight and speed of the car that has entered the approach track section 3AT. The control of the car retarder No. 3 in accordance with these conditions is by the energization of circuits comparable to those which have been described with reference to FIG. 10 for the control of the car retarder No. 2 under similar conditions. After retardation has been called for, the stick circuit by which relay 3TNP has been maintained picked up is opened so as to cause the dropping away of this relay to provide "single shot" operation in a manner comparable to that which has been described with reference to the control of relay 2TNP which is associated with car retarder No. 2.

Before relay 3TNP has time to be dropped away, however, the transfer relay 3TN (see FIG. 3E) is picked up by the energization of a circuit extending from (+), including front contact 278 of relay 3CK, front contact 279 of relay 3TNP, front contacts 280 and 281 of relays 3W1-2 and 3W2-2 respectively, connected in multiple, wire 316, back contact 282 of relay 3-5TPP, back contact 283 of relay 3W2, back contact 284 of relay 3W1, and winding of relay 3TN, to (−). The picking up of this relay closes a stick circuit at front contact 285 to shunt contacts 282 and 283 and 284 out of the circuit just described. The circuit for relay 3TN is also fed through back contact 286 when this relay becomes dropped away, and another stick circuit is provided for relay 3TN extending from (+), including front contact 287 of relay 3TN, wire 317, front contacts 280 and 281 of relays 3W1-2 and 3W2-2 connected in multiple, wire 316, front contact 285 of relay 3TN, and winding of relay 3TN, to (−).

Figure 3D:
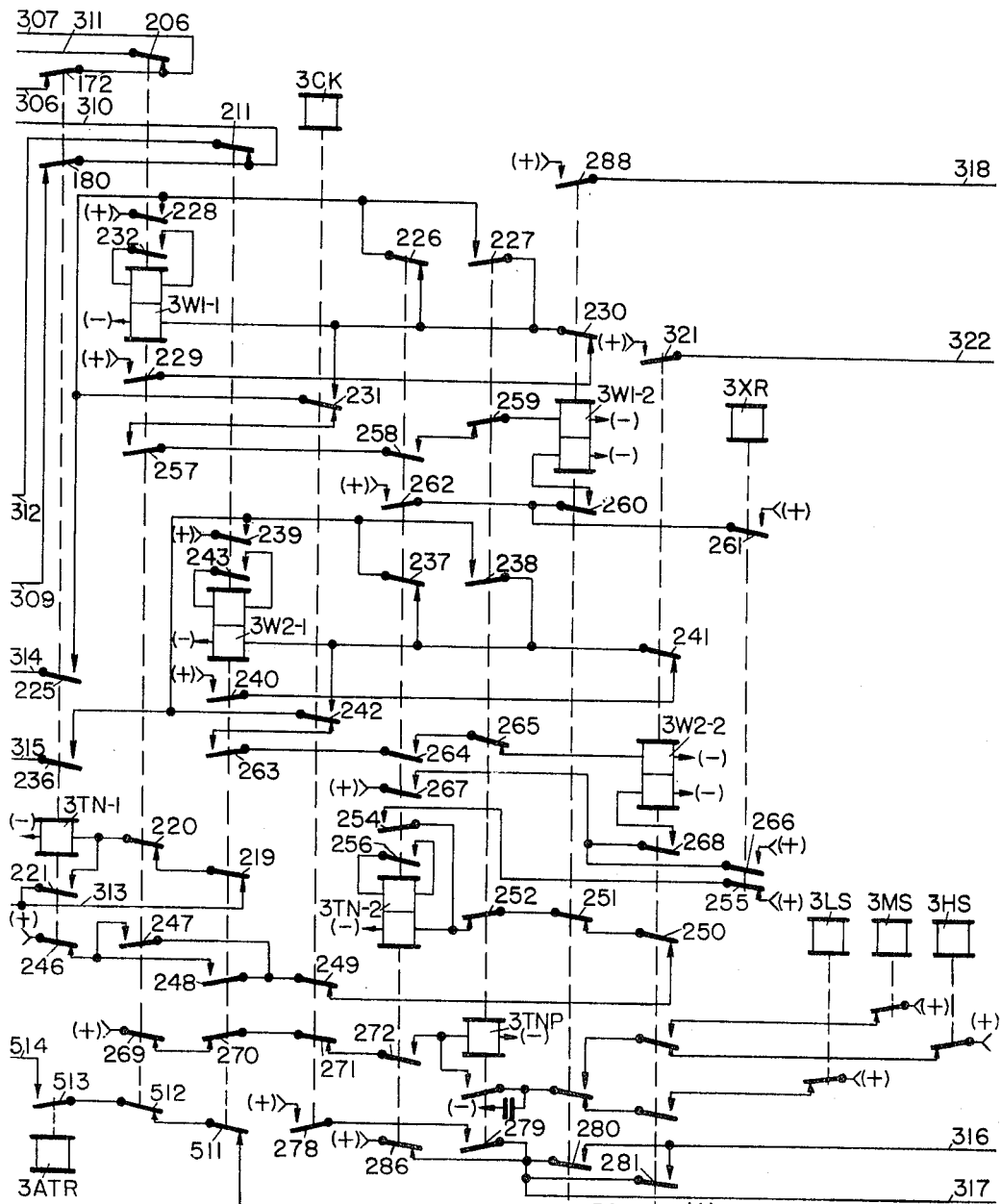

Upon the picking up of the transfer relay 3TN, the weight is transferred to the storage relays 3W1 and 3W2 (see FIG. 3E) from the relays 3W1-2 and 3W2-2 (see FIG. 3D). Thus the relay 3W1 is picked up if relay 3W1-2 has been energized by a circuit extending from (+), including front contact 288 of relay 3W1-2, wire 318, front contact 289 of relay 3TN, back contact 290 of relay 3-5TPP, back contact 291 of relay 3RWP, wire 319, back contact 292 of relay 4TN-1, wire 320, and lower winding of relay 3W1, to (−). Another pick up circuit selected according to another route is closed for relay 3W1 from (+), including front contact 288 of relay 3W1-2, wire 318, front contact 289 of relay 3TN, back contact 290 of relay 3-5TPP, back contact 293 of relay 3NWP, back contact 294 of relay 5RWP, back contact 295 of relay 6TN-1, and lower winding of relay 3W1, to (−). Another pick up circuit is closed for relay 3W1 corresponding to a different route extending from (+), including front contact 288 of relay 3W1-2, wire 318, front contact 289 of relay 3TN, back contact 290 of relay 3-5TPP, back contact 293 of relay 3NWP, back contact 296 of relay 5NWP, back contact 297 of relay 8TN-1, and lower winding of relay 3W1, to (−).

If weight storage is to be transferred from the relay 3W2-2 to relay 3W2, relay 3W2 is picked up upon the picking up of the transfer relay 3TN by the energization of a circuit extending from (+), including front contact 321 of relay 3W2-2, wire 322, front contact 323 of relay 3TN, back contact 324 of relay 3-5TPP, back contact 325 of relay 3RWP, wire 326, back contact 327 of relay 4TN-1, wire 328, and lower winding of relay 3W2, to (−). Another pick up circuit for relay 3W2, corresponding to a different route, is also energized extending from (+), including front contact 321 of relay 3W2-2, wire 322, front contact 323 of relay 3TN, back contact 324 of relay 3-5TPP, back contact 329 of relay 3NWP, back contact 330 of relay 5RWP, back contact 331 of relay 6TN-1, and lower winding of relay 3W2, to (−).

A third circuit, corresponding to a third route, is also cloed extending from (+), including front contact 321 of relay 3W2-2, wire 322, front contact 323 of relay 3TN, back contact 324 of relay 3-5TPP, back contact 329 of relay 3NWP, back contact 332 of relay 5NWP, back contact 333 of relay 8TN-1, and lower winding of relay 3W2, to (−).

Stick circuits are established for the relays 3W1 and 3W2 shunting out portions of the pick up circuits. The stick circuit for relay 3W1 extends from (+), including front contact 334 of relay 3-5TP connected in multiple with back contact 335 of relay 3-5TPP, front contact 336 of relay 3W1, back contact 291 of relay 3RWP, wire 319, back contact 292 of relay 4TN-1, wire 320, and lower winding of relay 3W1, to (−). A similar stick circuit is provided for each of the other route selections. Relay 3W2 is maintained picked up by a similar stick circuit extending from (+), including front contact 337 of relay 3-5TP connected in multiple with back contact 338 of relay 3-5TPP, front contact 339 of relay 3W2, back contact 325 of relay 3RWP, wire 326, back contact 327 of relay 4TN-1, wire 328, and lower winding of relay 3W2, to (−).

As the car progresses through the intermediate car retarder No. 3 and as the speed of the car is reduced, the speed relays S governed by the interferometer associated with car retarder No. 3 become dropped away, and the car retarder mechanism is correspondingly opened to lighter braking positions in accordance with the mode of operation that has been heretofore described for progress of a car through car retarders Nos. 1 and 2.

When the car within the intermediate car retarder No. 3 progresses to a point near the exit end of the car retarder, the exit relay 3XR is picked up, and the picking up of this relay causes the dropping away of the transfer 3TN–2 (see FIG. 3D) by the opening of its stick circuit at back contact 255. The weight relays 3W1 and 3W2 are maintained picked up until the car has left the car retarder No. 3 by the energization of stick circuits that have been described.

Figure 12K:
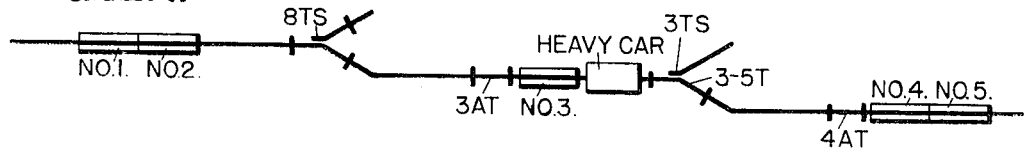
Figure 13K:
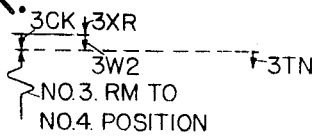
Figure 12L:
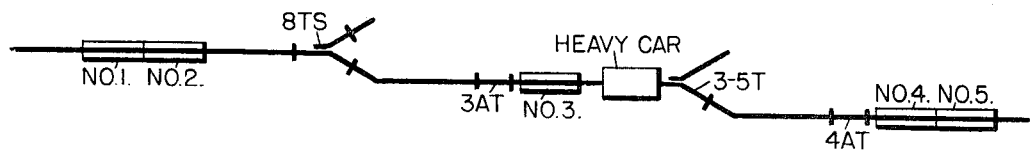
Figure 13L:
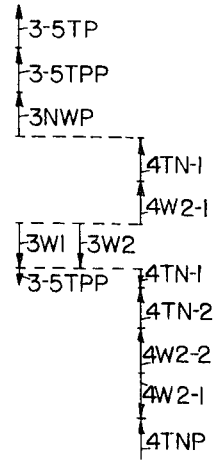

When the car leaves car retarder No. 3 as is indicated in the diagram of FIG. 12K, relay 3XR becomes dropped away, and the dropping away of that relay causes the dropping away of whichever of the weight relays 3W1–2 and 3W2–2 has been energized by the opening of their respective stick circuits at front contacts 261 and 266 respectively.

With reference to FIG. 6, the dropping away of relay 3XR causes the dropping away of the relay 3CK by opening its circuit at front contact 276, the relay 3TN–2 having been dropped away so that front contact 275 is open. Upon the dropping away of relay 3CK, energy is removed from the speed relays 3LS, 3MS and 3HS by the opening of front contact 277, and the dropping away of relay 3CK causes the closing of the car retarder to its normal position in a manner comparable to that which has been described with reference to FIG. 10 for the closing of car retarder No. 2. Relay 3TN becomes dropped away in accordance with the cancellation of weight storage by the relays 3W1–2 and 3W2–2 because of the opening of front contacts 280 and 281 respectively.

When a car progresses to the point where it enters the detector track section 3–5T, the track relay 3–5TR becomes dropped away and the dropping away of that relay closes an obvious circuit at back contact 350 (see FIG. 3E) to cause the picking up of the back contact repeater relay 3–5TP. The picking up of relay 3–5TP causes the picking up of relay 3–5TPP by the energization of a circuit extending from (+), including back contacts 340, 341, 342, and 343 of relays 5NWP, 5RWP, 3NWP, and 3RWP respectively, front contact 344 of relay 3–5TP, front contact 345 of relay 3W1 connected in multiple with front contact 346 of relay 3W2, and winding of relay 3–5TPP, to (−). The picking up of relay 3–5TPP closes a stick circuit extending from (+), including front contact 347 of relay 3–5TPP, front contact 345 of relay 3W1 connected in multiple with front contact 346 of relay 3W2 and winding of relay 3–5TPP, to (−). Another stick circuit is provided for relay 3–5TPP including front contact 348 of relay 3TN and front contact 349 of relay 3–5TPP.

Inasmuch as the track switches 3TS and 5TS are lap switches having a common detector track section, the positions of both of these track switches have to be taken into account in determining the selection of circuits governing transfer of weight description for use in governing the group car retarders. This selection is made in accordance with the selective energization of the switch repeater relays 3NWP, 3RWP, 5NWP and 5RWP, the energization of which is rendered effective in a manner comparable to that which has been described for the energization of similar relays upon the entrance of a car into the detector track section 8T.

If the route for the car is over track switch 3TS in its normal position, relay 3NWP is picked up, and the picking up of this relay establishes a stick circuit for relay 3W1 (if this relay has been picked up). This stick circuit extends from (+), including front contact 334 of relay 3–5TP connected in multiple with back contact 335 of relay 3–5TPP, front contact 351 of relay 3W1, front contact 352 of relay 3NWP, wire 353, back contact 354 of relay 4W1–1, wire 320, and lower winding of relay 3W1, to (−). The upper winding of relay 3W1 is shunted through front contact 355 to cause that relay to be slow in dropping away. It will be noted that the picking up of relay 3NWP opens the branches of the pick-up circuit for relay 3W1 that do not correspond to the route that is selected by the opening of back contact 293.

In a similar manner, if the relay 3W2 has been picked up, a stick circuit is established for this relay, upon the picking up of relay 3NWP, extending from (+), including front contact 337 of relay 3–5TP connected in multiple with back contact 338 of relay 3–5TPP, front contact 356 of relay 3W2, front contact 357 of relay 3NWP, wire 358, back contact 359 of relay 4W2–1, wire 328, and lower winding of relay 3W2, to (−). The upper winding of relay 3W2 is shunted through front contact 360 to make this relay slow to drop away. The pick-up circuits for relay 3W2 not conforming to the route set up are opened at back contact 329 of relay 3NWP. It will be readily apparent that similar stick circuits are provided for the relays 3W1 and 3W2 selected through each of the other two possible routes as selected by the lap switches 3TS and 5TS.

When the relays 3NWP, 3RWP, 5NWP, and 5RWP are selectively energized upon entrance of a car into the detector track section 3–5T, provided that the relays 4W1–1 and 4W2–1 (see FIG. 3F) are free to accept a weight storage, the transfer relay 4TN-1 becomes picked up, or a corresponding transfer relay for one of the other routes. If the track switch 3TS is in its normal position, a pickup circuit is closed for the relay 4TN–1 extending from (+), including front contact 361 of relay 3W1 (see FIG. 3E) connected in multiple with front contact 362 of relay 3W2, front contact 363 of relay 3–5TP, front contact 364 of relay 3–5TPP, front contact 365 of relay 3NWP, wire 366, back contacts 367 and 368 of relays 4W2–1 and 4W1–1 respectively and winding of relay 4TN–1, to (−). The picking up of this relay closes a stick circuit at front contact 369 shunting back contacts 367 and 368 out of the circuit just described. If the track switch 3TS is operated to its reverse position and the track switch 5TS is operated to its normal position, a similar circuit is closed for the energization of relay 6TN–1 (shown only in block form in FIG. 3E). The circuit for relay 6TN–1 is selected through front contact 370 of relay 3RWP and front contact 371 of relay 5NWP. If the route is established calling for the energization of relays 3RWP and 5RWP, relay 8TN–1 (shown only in block form) is picked up through a circuit including front contact 370 of relay 3RWP and front contact 372 of relay 5RWP.

When the transfer relay 4TN–1 for transfer to a group car retarder is picked up as has been described, the associated weight storage relays become energized in accordance with the weight description to be transferred. Thus, for example, if the route is over the track switch 3TS in its normal position so that the transfer relay 4TN–1 (see FIG. 3F) has been picked up as has been described, the weight relay 4W1–1 can be picked up in accordance with the energization of the relay 3W1 (see FIG. 3E). The circuit by which relay 4W1–1 is picked up extends from (+), including front contact 373 of relay 3W1, front contact 374 of relay 3NWP, wire 396, front contact 375 of relay 4TN–1, back contact 376 of relay 4TN–2 connected in multiple with front contact 377 of relay 4TNP, and lower winding of relay 4W1–1, to (−). Stick energy is provided for relay 4W1–1 through its front contact 378 and through back contact 379 of relay 4W1–2. Another stick circuit extends from (+), including front contact 380 of relay 4W1–1, back contact 376 of relay 4TN–2 connected in multiple with front contact 377 of relay 4TNP and lower winding of relay 4W1–1, to (−). The upper winding of relay 4W1–1 is shunted through front contact 381 to make this relay slow in dropping away. Another stick circuit for relay 4W1–1 extends through front contact 380 of relay 4W1–1 and front contact 410 of relay 4CK.

If the route for the car should be selected over track switch 3TS in its reverse position and track switch 5TS in its normal position, relay 6W1–1 would be energized by a similar circuit to that described for relay 4W1–1 except that the circuit would be selected through front contact 382 of relay 3RWP and front contact 383 of relay 5NWP. If the route for the car should be selected through the track switch 3TS in its reverse position and track switch 5TS in its reverse position, relay 8W1–1 would be energized by a circuit similar to that described for relay 4W1–1 except that the circuit would be selected through front contact 382 of relay 3RWP and front contact 384 of relay 5RWP.

If the weight description to be transferred is in accordance with the energization of relay 3W2 (see FIG. 3E), relay 4W2–1 (see FIG. 3F) is picked up, if the track switch 3TS is in its normal position. The circuit by which relay 4W2–1 is energized extends from (+), including front contact 385 of relay 3W2 (see FIG. 3E), front contact 386 of relay 3NWP, wire 397, front contact 387 of relay 4TN–1, back contact 388 of relay 4TN–2 connected in multiple with front contact 389 of relay 4TNP and lower winding of relay 4W2–1, to (—). The picking up of relay 4W2–1 closes a stick circuit through its front contact 390 and back contact 391 of relay 4W2–2. Another stick circuit is closed for relay 4W2–1 extending from (+), including front contact 392 of relay 4W2–1, back contact 388 of relay 4TN–2 connected in multiple with front contact 389 of relay 4TNP, and lower winding of relay 4W2–1, to (—). Another stick circuit for relay 4W2–1 extends through front contact 392 of relay 4W2–1 and front contact 417 of relay 4CK. The upper winding of relay 4W2–1 is shunted through front contact 393 to make relay 4W2–1 slow in dropping away.

If the route selected for the car is over the track switch 3TS in its reverse position and track switch 5TS in its normal position, the weight relay 6W2–1 (shown in block form in FIG. 3E) is picked up by the energization of a similar circuit to that which has been described for the energization of relay 4W2–1, this circuit being selected through front contact 394 of relay 3RWP and front contact 395 of relay 5NWP. If the route is over the track switch 3TS in its reverse position and the track switch 5TS in its reverse position, relay 8W2–1 (shown in block form in FIG. 3E) is picked up by the energization of a circuit similar to that which has been described for the energization of relay 4W2–1 except that such circuit is selected through front contact 394 of relay 3RWP and front contact 398 of relay 5RWP.

In accordance with the picking up of relay 4W1–1 (assuming a route through track switch 3TS in its normal position), relay 3W1 becomes dropped away by the opening of its circuit at back contact 354 of relay 4W1–1, and similarly the picking up of relay 4W2–1 causes the dropping away of relay 3W2 by opening the stick circuit for that relay at back contact 359. It will be noted that the pick up circuits for these relays are open at this time because of the energization of relay 4TN–1 at back contacts 292 and 327. It will be readily understood that a similar mode of operation is effective for each of the other routes.

Upon the dropping away of relays 3W1 and 3W2 (see FIG. 3E), the removal of energy by the respective front contacts 361 and 362 causes the dropping away of the transfer relay 4TN–1 (see FIG. 3F). The dropping away of the weight storage relays 3W1 and 3W2 also causes the dropping away of the relay 3–5TPP (see FIG. 3E) by the opening of its circuit at front contacts 345 and 346 respectively.

Upon the picking up of one or both of the relays 4W1–1 and 4W2–1, a pick up circuit is provided for the transfer relay 4TN–2, assuming that the relays 4W1–2 and 4W2–2 are both in their dropped away positions. The circuit by which the relay 4TN–2 is energized extends from (+), including back contact 399 of relay 4TN–1, front contacts 400 and 401 of relays 4W1–1 and 4W2–1 respectively connected in multiple, back contact 402 of relay 4CK, back contact 403 of relay 4W2–2, back contact 404 of relay 4W1–2, back contact 405 of relay 4TNP, and lower winding of relay 4TN–2, to (—). A stick circuit is closed for relay 4TN–2 including back contact 407 of relay 4XR and front contact 408 of relay 4TN–2. Relay 4TN–2 is made slow to drop away by the shunting of its upper winding through front contact 409.

With the transfer relay 4TN–2 picked up, the relays 4W1–2 and 4W2–2 are conditioned for energization in accordance with the picked up condition of the relays 4W1–1 and 4W2–1 respectively. Thus, if relay 4W1–1 is picked up, the relay 4W1–2 becomes energized by a circuit extending from (+), including front contact 380 of relay 4W1–1, back contact 410 of relay 4CK, front contact 411 of relay 4W1–1, front contact 412 of relay 4TN–2, back contact 413 of relay 4TNP, and upper winding of relay 4W1–2, to (—). This relay is maintained picked up by a stick circuit fed by front contact 414 of relay 4TN–2 and front contact 415 of relay 4XR connected in multiple, and through front contact 416 of relay 4W1–2.

If relay 4W2–1 is picked up, the relay 4W2–2 becomes energized at this time by a circuit extending from (+), including front contact 392 of relay 4W2–1, back contact 417 of relay 4CK, front contact 418 of relay 4W2–1, front contact 419 of relay 4TN–2, back contact 420 of relay 4TNP and upper winding of relay 4W2–2, to (—). The picking up of this relay closes a stick circuit for its lower winding fed by front contact 421 of relay 4TN–2 and front contact 422 of relay 4XR connected in multiple, and through front contact 423 of relay 4W2–2.

The picking up of one or both of the storage relays 4W1–2 and 4W2–2 causes the dropping away of the corresponding relays 4W1–1 and 4W2–1 under the assumed conditions by the opening of back contacts 379 and 391 respectively.

When the relays 4W1–1 and 4W2–1 become deenergized, relay 4TNP becomes picked up by the energization of a circuit extending from (+), including back contact 424 of relay 4W1–1, back contact 425 of relay 4W2–1, back contact 426 of relay 4CK, front contact 427 of relay 4TN–2, and winding of relay 4TNP, to (—). This relay when picked up is maintained energized by a selected stick circuit in accordance with a similar mode of operation described for the relay 1TNP so that the relay 4TNP is maintained picked up until retardation is called for for car retarder No. 4.

Figure 12M:
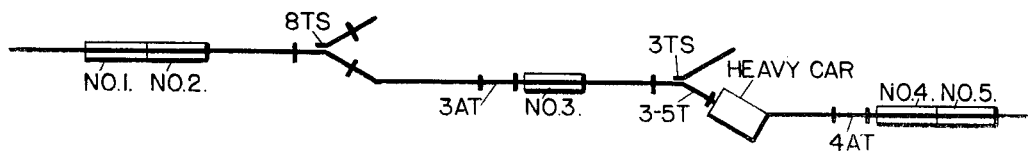
Figure 12N:
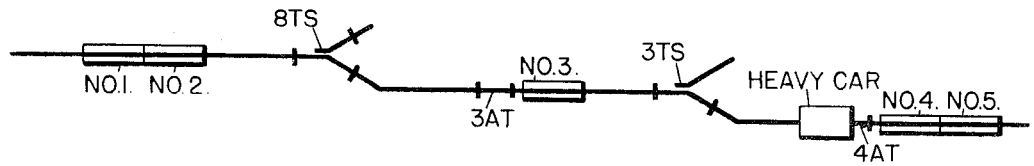
Figure 13N:
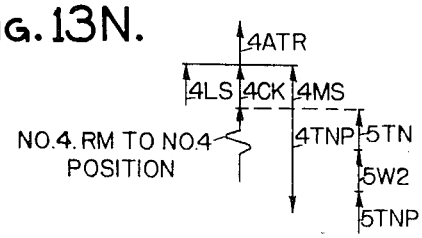

To consider further operation upon passage of a car, it will be assumed that a car leaves the detector track section 3–5T as is indicated in the diagram of FIG. 12M. The picking up of the track relay 3–5TR (see FIG. 3E) causes the dropping away of relay 3–5TP in accordance with the opening of its circuit at back contact 350. The dropping away of this relay causes the dropping away of whichever ones of the relays 3RWP, 3NWP, 5RWP, and 5NWP is picked up at that time by the removal of stick energy upon the opening of front contacts 428 and 429.

To consider further operation upon passage of a car, it will be assumed that a car enters the approach track section 4AT, and, in accordance therewith, causes the picking up of the approach relay 4ATR (see FIG. 7) by the energization of an obvious circuit. The circuit for the energization of relay 4ATR is comparable to that which has been described with refrence to FIG. 6 for the relay 3ATR. Relay 4ATR when picked up permits the energization of relay 4CK and the speed relays associated with the control of car retarder No. 4 in a manner comparable to that which has been described for the energization of corresponding relays associated with other car retarder. When retardation is called for, the relay 4TNP is dropped away, but this relay is made to have slow drop away characteristics in a manner that has been described for the relay 1TNP so as to permit transfer of weight storage to the storage relay for car retarder No. 5 to first become effective.

The transfer relay 5TN becomes picked up upon the picking up of the check relay 4CK by the energization of a circuit extending from (+), including front contact 430 of relay 4CK, front contact 431 of relay 4TNP, front contact 432 of relay 4W1–2 connected in multiple with front contact 433 of relay 4W2–2, wire 434, back contacts 435, 436, and 437 of reelays 5W2, 5W1 and 5TNP respectively, and winding of relay 5TN, to (−). A stick circuit is closed for relay 5TN at front contact 439 including wire 444 and shunting front contacts 430 and 431 and back contact 440 out of the control circuit for relay 5TN. Relay 5TN is further maintained energized by stick energy applied through back contact 441 of relay 5XR and front contact 442 of relay 5TN.

The picking up of relay 5TN conditions the weight storage relays 5W1 and 5W2 for energization so that relay 5W1 can be picked up at this time, if relay 4W1–2 is picked up. The circuit for the energization of relay 5W1 extends from (+), including front contact 443 of relay 4W1–2, wire 445, back contact 446 of relay 5CK, front contact 447 of relay 5TN, back contact 448 of relay 5TNP, and upper winding of relay 5W1, to (−). A stick circuit is closed for the lower winding of relay 5W1 upon the picking up of this relay. The stick circuit for relay 5W1 is fed by front contact 449 of relay 5TN and front contact 450 of relay 5XR through front contact 451 of relay 5W1.

If weight transfer is in accordance with the relay 4W2–2 being in its picked up position, relay 5W2 becomes energized by a circuit extending from (+), including front contact 452 of relay 4W2–2, wire 453, back contact 454 of relay 5CK, front contact 455 of relay 5TN, back contact 456 of relay 5TNP, and upper winding of relay 5W2, to (−). This relay when picked up is maintained energized by a stick circuit for its lower winding comparable to the stick circuit described for the energization of relay 5W1.

Upon the setting up of a weight storage by the relays 5W1 and 5W2, the relay 5TNP becomes picked up by the energization of a circuit extending from (+), including back contact 457 of relay 5CK, front contact 458 of relay 5TN, front contact 459 of relay 5W1, connected in multiple with front contact 460 of relay 5W2, and winding of relay 5TNP, to (−). The picking up of this relay establishes a stick circuit comparable to the stick circuit that has been described for the similar relay 1TNP.

Figure 12P:
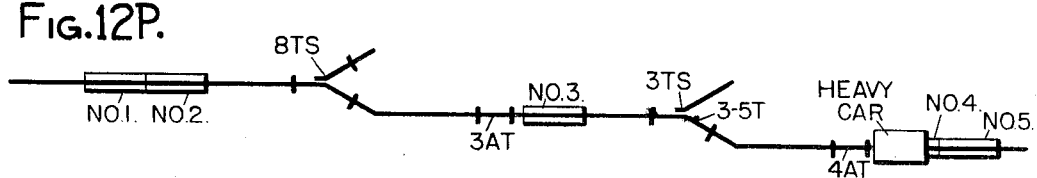
Figure 13P:
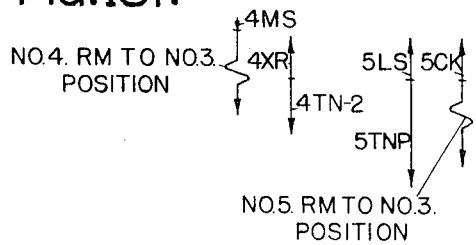
Figure 12Q:
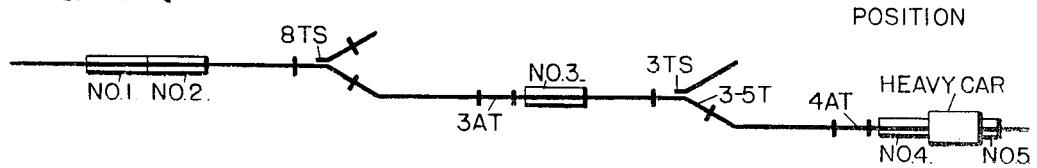
Figure 13Q:
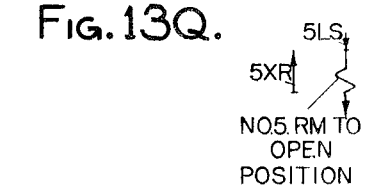

If the speed of a car is reduced while the car is within the retarder No. 4, the speed relays S governed by the interferometer become selectively deenergized, and deenergization calls for the opening of the car retarder to lesser braking positions in accordance with the general mode of operation that has been described. When the car approaches the exit end of car retarder No. 4 as is illustrated in FIG. 12P, the exit relay 4XR governed by the interferometer for car retarder No. 4 is picked up in accordance with the mode of operation that has been described more specifically for similar apparatus associated with other car retarders, and the picking up of that relay causes the dropping away of the transfer relay 4TN–2 (see FIG. 3F) by the opening of back contact 407. The weight storage relays 4W1–2 and 4W2–2 are, however, maintained picked up until the opening of their stick circuits at front contacts 415 and 422 respectively upon the dropping away of relay 4XR.

*Operation for cuts of cars*

The mode of operation for cuts of cars is similar to the mode of operation that has been described except for modifications which will be hereinafter considered. One of the problems peculiar to the braking of cuts of cars is that the cars of a cut may be of several different weights, and it is necessary to govern retardation by the heaviest weight car, this heaviest weight being that which is used for transfer through the respective weight storages for governing the braking of the cut through the respective car retarders as the cut progresses.

It is thus provided that the weight storage relays 2W1 and 2W2 for governing car retarder No. 2 can have their weight storage changed in accordance with the change in the condition of the weight relays 1LW, 1MW, and 1HW which are governed directly by the weighing device WD during passage of a cut of cars. Thus, if the first car of a cut is a light weight car, the relay 2W1 is picked up in accordance with the energization of relay 1LW and the relay 2W2 remains in its dropped away position. If, however, a medium weight car is weighed in the cut, the relay 1MW is picked up, and the picking up of this relay opens the stick circuit for relay 1LW and causes that relay to be dropped away. Then in accordance wtih the relay 1MW being picked up, the relays 2W1 and 2W2 both become picked up to store weight description for a medium weight car. If there should be a heavy weight car in the cut, relay 1HW would be picked up by the weighing device WD and the picking up of this relay, by opening back contact 34, would cause the dropping away of whichever of the relays 1LW or 1MW may have been picked up in accordance with the weighing of a prior car in the cut. In accordance with the energization of relay 1HW, the relay 2W2 becomes energized for the storage of a heavy weight by the energization of a circuit that has been described. Thus the weight stored by the relays 2W1 and 2W2 can be changed during passage of a cut of cars over the weighing device WD, but the heaviest weight is the weight that is finally stored by the relays 2W1 and 2W2, and it is this heaviest weight that is transferred through respective weight storages as the cut of cars progresses, and each of the car retarders that the cut of cars subsequently passes through is operated in accordance with the heaviest weight detected for the cut of cars, irrespective of the order in which the different weight cars of the cut are weighed as the cut passes over the weighing device WD.

It will be readily apparent that there should be only one weight storage to go with each cut of cars as it progresses. Thus one of the problems is to distinguish between the different cuts of cars so that only one weight storage is transferred for each cut.

After the first car in a cut has proceeded through a car retarder, the weight description is transferred along with the passage of a car as has been described, but there are still cars at the rear of the cut which have yet to pass through the initial car retarder, and thus the prior weight storage should not be cancelled, under these conditions, even though transfer of the weight storage has taken place. To provide this mode of operation the weight relays 2W1 and 2W2, for example, are held through front contacts 154 and 157 respectively of relay 2XR until the passage of the rear end of the cut of cars through car retarder No. 1.

The principal function of relay 8TPP is to maintain the weight storages in step with the respective cars and cuts of cars with which they are associated. A car must occupy the track section 8T before its weight storage can be transferred on for the control of an intermediate car retarder, and then transfer can be made only if the exit relay 1XR (see FIG. 3A) has been dropped away by passage of the rear end of the cut through car retarder No. 1. By preventing relay 8TPP from operating a second time, the circuit for transferring the weight storage is kept open until a separate car or cut of cars enters the detector track section 8T. This single operation is accomplished because relay 8TPP is controlled so as to be picked up only when a car enters the detector track section 8T by requiring the switch repeater relays 8NWP and 8RWP to be in their dropped away positions. Thus, even if relay 8TPP is dropped away upon transfer of a storage while the track section 8T is still occupied, it cannot again be picked up until the track section 8T has become unoccupied so as to permit the dropping away of the switch repeater relay 8NWP or 8RWP that has been energized. It is thus provided that relay 8TPP permits the transfer of weight information when the track circuit is first shunted, but prevents the transfer of subsequent information received by the associated weight storage relays while the track section 8T is still occupied.

If, for some reason, the weight storage is not transferred from the relays 8W1 and 8W2 before a car or cut of cars leaves the detector track section 8T, the stick circuits for these relays are opened at front contacts 185 and 188 respectively of relay 8TP to effect automatic cancellation.

Under conditions where exceptionally long cuts of cars are classified, it may be that the first car of such a cut may reach an intermediate car retarder before the rear end of the cut has passed through car retarder No. 1 so as to cause the dropping away of the exit relay 1XR to initiate transfer of weight description to the storage unit for the intermediate car retarder. Under these conditions, it is provided that the entrance of the first car of such a long cut into the approach track section for an intermediate car retarder such as the track section 3AT, for example, causes transfer to take place by providing a circuit for the energization of the transfer relay 8TN. The circuit by which the relay 8TN is thus picked up in accordance with the entrance of the approach track section 3AT extends from (+), including back contact 509 of relay 3W2-2 (see FIG. 3D), back contact 510 of relay 3W1-2, back contact 511 of relay 3W2-1, back contact 512 of relay 3W1-1, front contact 513 of relay 3ATR, wire 514, front contact 515 of relay 8NWP, wire 516, front contacts 162 and 163 of relays 2W1 and 2W2 connected in multiple, wire 304, back contact 164 of relay 8TPP, back contact 165 of relay 8W2, back contact 166 of relay 8W1, and winding of relay 8TN, to (−). The picking up of this relay causes the transfer of weight description to become effective by the same mode of operation that has been described.

*Curve correction*

In practice, a hump yard has many more tracks than is illustrated in FIG. 1, and because of the large number of tracks, different track curvatures have to be provided. Actually each of the stretches of track including the group car retarders may govern the passage of cars to selected ones of 8 or 9 classification tracks rather than to a selected one of 2 tracks as is the case in the track layout of FIG. 1. Certain of these tracks generally are harder rolling routes than others because of track curvature, grading or other things that may affect the rollability of a car. It will be readily apparent, in view of the above considerations, that in addition to governing the group car retarders in accordance with the weight and speed of a car, the group car retarders should be governed also in accordance with the route of each car passing through the associated car retarder in order to provide curve correction so as to permit cars to leave the car retarders at higher rates of speed for passage over harder rolling routes. The route information for curve correction is available, assuming an automatic switching system is employed such as is disclosed, for example, in the Brown et al. patent, No. 2,194,353 dated March 19, 1940. A system of this character is illustrated by the block diagram of FIG. 11. This diagram illustrates the general organization of the system, and reference can be made to the above mentioned Brown et al. patent for a more detailed disclosure of the automatic switching system.

This system comprises a control panel P2 which is provided with a push button PB for each of the classification tracks for actuation by a trainman to designate the respective destinations for cars and cuts of cars released at the hump.

When a destination is thus designated, a route description storage is set up in a bank of storage relays such as the storage 8S that has been illustrated in block form as being associated with track switch 8TS. When the car for which the storage is provided passes through the track switch 8TS, the route description is transferred to the storage 10–12S or 3–5S, in accordance with the position of the track switch 8TS at that time. Route information stored by storage 10–12S is used for positioning the lap switches 10TS and 12TS and route information stored by storage 3–5S is used for positioning the lap switches 3TS and 5TS.

Storage relays 1B1, 2B1, and 3B1 have been illustrated as being associated with the route storage 3–5S, and the respective positions of these relays is indicative of the position called for for the lap switches 3TS, 5TS and for the last track switch respectively. Either of these relays when picked up calls for operation of the associated track switch to a reverse position, and when dropped away calls for the normal position of the associated track switch.

For this embodiment of the present invention it has been assumed that harder rolling routes are with track switch 3TS in its normal position and track switch 2TS in its reverse position, and with track switch 5TS in its normal position and track switch 4TS in its reverse position.

A curve correction control lever CCL is provided having a left hand automatic position wherein a curve correction relay 3CC is subject to control automatically in accordance with the route descriptions, and a right hand operated position wherein the relay 3CC is directly subject to manual control, irrespective of the route a car is to take.

The curve correction relay 3CC (see FIG. 3E) is provided with a control circuit to provide for its energization only when one of the above described route descriptions is set up by the positions of the route storage relays 1B1, 2B1 and 3B1 (see FIGS. 3E and 10), with the further provision that the curve correction relay 3CC can be energized only upon the entrance of a car into the detector track section 3–5T. It is to be understood that the relay 3CC could as well be rendered responsive for other route descriptions than those illustrated as being hard rolling routes in accordance with the requirements of practice.

If the route storage 3–5S is set up for a route to track 2 at a time when a car enters the detector track section 3–5T, the relay 3CC becomes picked up by the energization of a circuit extending from (+), including back contact 461 of relay 1B1, front contact 462 of relay 3B1, contact 463 of lever CCL in its left hand position, back contacts 464, 465, 466 and 467 of relays 5NWP, 5RWP, 3NWP and 3RWP respectively, front contact 468 of relay 3–5TP, and winding of relay 3CC, to (−). This relay when picked up is maintained energized as long as a weight storage is set up by the relays 3W1 and 3W2 by the energization of a circuit extending from (+), including front contact 469 of relay 3CC, front contact 470 of relay 3W1 connected in multiple with front contact 471 of relay 3W2, and winding of relay 3CC, to (−). If the route description is for the other hard rolling route that has been described, energy is applied to the pick up circuit for relay 3CC through back contact 477 of relay 2B1 and front contact 462 of relay 3B1.

When curve correction has been called for by the picking up of relay 3CC as has been described, the transfer of this storage becomes effective by a mode of operation similar to that which has been described for the transfer of the weight storage set up by the conditions of the relays 3W1 and 3W2, the same transfer relay 4TN–1 being used for the transfer of both types of information in accordance with the progress of a car or cut of cars for which this information is provided.

Thus, when the transfer relay 4TN–1 is picked up as has been described, the relay 4CC–1 (see FIG. 3F) becomes picked up in accordance with the energization of relay 3CC, provided that the route selected is through the track switch 3TS in its normal position. The pick up circuit for relay 4CC–1 extends from (+), including front contact 473 of relay 3CC, front contact 474 of relay 3NWP, wire 478, front contact 475 of relay 4TN–1, back contact 476 of relay 4TN–2, connected in multiple with front contact 477 of relay 4TNP, and lower winding of relay 4CC–1, to (−). Relay 4CC–1 when picked up closes a stick circuit extending from (+), including front contact 479 of relay 4CC–1, back contact 476 of relay 4TN–2, connected in multiple with front contact 477 of relay 4TNP, and lower winding of relay 4CC–1, to (−). Another stick circuit is provided for relay 4CC–1, when a car has caused the picking up of the check relay 4CK, extending from (+), including front contact 480 of relay 4CK, front contact 481 of relay 4CC–1 and lower winding of relay 4CC–1, to (−). It is also provided that with the relay 4CK picked up the relay 4CC–1 can be picked up independent of the selections through contacts of the switch repeater relays. The circuit by which relay 4CC–1 can be energized under these conditions extends from (+), including front contact 480 of relay 4CK, wire 482, front contact 483 of relay 3CC, wire 484, front contact 485 of relay 4TN–1, and lower winding of relay 4CC–1, to (−). There is also a stick circuit provided for relay 4CC–1 whereby it is maintained energized through back contact 486 of relay 4CC–2 and front contact 487 of relay 4CC–1. Relay 4CC–1 is made slow to drop away by the shunting of its upper winding through front contact 488.

It will be readily apparent that a similar circuit organization (only partially shown) is provided for another relay CC–1 (not shown) when front contacts 489 and 490 of relays 3RWP and 5RWP respectively are closed, and another relay CC–1 (not shown) is picked up when front contacts 489 and 491 of relays 3RWP and 5NWP are closed.

If relay 4CC–1 is in its picked up position when the weight description is transferred from relays 4W1–1 and 4W2–1 to relays 4W1–2 and 4W2–2 respectively, the relay 4CC–2 becomes picked up by the energization of a circuit extending from (+), including front contact 492 of relay 4CC–1, back contact 493 of relay 4CK, front contact 494 of relay 4TN–2, back contact 495 of relay 4TNP, and lower winding of relay 4CC–2, to (−). This relay, when picked up, is maintained energized by a stick circuit for its upper winding extending from (+), including front contact 496 of relay 4TN–2, connected in multiple with front contact 497 of relay 4XR, front contact 498 of relay 4CC–2, and upper winding of relay 4CC–2, to (−).

When the weight description is transferred from the relays 4W1–2 and 4W2–2 to the relays 5W1 and 5W2 respectively, relay 5CC becomes picked up if the relay 4CC–2 is in its picked up position. The pick up circuit for relay 5CC extends from (+), including front contact 499 of relay 4CC–2, wire 500, back contact 501 of relay 5CK, front contact 502 of relay 5TN, back contact 503 of relay 5TNP, and lower winding of relay 5CC, to (−). This relay when picked up is maintained energized by a stick circuit extending from (+), including front contact 504 of relay 5W1 connected in multiple with front contact 505 of relay 5W2, front contact 506 of relay 5CC, and upper winding of relay 5CC, to (−).

The curve correction relays 4CC–2 and 5CC act upon the radar speed responsive apparatus for car retarders Nos. 4 and 5 respectively as is illustrated in the circuits of FIGS. 7 and 8 respectively. In FIG. 7, for example, if relay 4CC–2 is picked up, the opening of back contact 507 removes a shunt normally applied around a resistor 525 so as to increase the speeds at which the speed relays 4LS, 4MS, and 4HS will be respectively picked up. This provides that these speed relays will also drop away at a higher speed, and thus open car retarder No. 4 when the car is travelling at a higher rate of speed than when back contact 507 is closed.

*Cancellation*

There are times when it may be desirable to cancel the weight storages manually. One of these times, for example, may be where there is not sufficient spacing maintained between cars for proper operation. Cancellation of weight storages can be accomplished by actuation of a cancel button or lever such as the lever CAN of FIG. 14 so as to momentarily remove low voltage energy from the weight storage relays and associated transfer circuits by the opening of contact 508.

Having thus described one embodiment of the present invention as applied to a simple track layout, it is to be understood that the invention is not limited to the specific form shown, and that additions, changes and modifications may be made without in any manner departing from the spirit or scope of the present invention, except as limited by the scope of the following claims.

What we claim is:

1. In a car retarder control system for railroads, a hump classification yard having several classification tracks connected by track switches to a single stretch of track extending over a hump, said classification yard having car retarders disposed between certain of the track switches and in said single stretch of track so that a car passes through a succession of car retarders spaced by facing point track switches in travelling from the hump to a classification track, weight indicating means subject to actuation in accordance with the weight of a car, weight storage and transfer means associated with the respective car retarders and initially effective for the first car retarder in said succession to set up a storage indicative of the weight of the car in response to actuation of said weight indicating means, said weight storage and transfer means being effective to transfer the weight storage for the first car retarder to the weight storage means for the other car retarders selectively in a succession corresponding to the route of a car as the car progresses, and car retarder control means for each of the car retarders for governing the degree of retardation in accordance with the condition of said weight storage means for the associated car retarder.

2. A car retarder control system for railroads comprising in combination, a hump classification yard having several classification tracks fed through various track switches from a single track extending over a hump and having car retarders between several of the track switches so that each car passes through a succession of car retarders spaced by at least one facing point track switch in travelling from the hump to a classification track, a weighing device in said stretch of single track ahead of the first of said succession of car retarders, weight storage and transfer means associated with the respective car retarders initially effective for the first car retarder in said succession to set up a storage indicative of the weight of a car in response to actuation by a car of said weighing device, said weight storage and transfer means being effective to transfer the weight storage for the first car retarder to the weight storage means for the other car retarders selectively in a succession corresponding to the route of a car as the car progresses, and car retarder control means for each of the car retarders for governing the degee of retardation in accordance with the condition of said weight storage means for the associated car retarder.

3. In a car retarder control system for railroads, a hump classification yard having several classification tracks connected by track switches to a single stretch of track extending over a hump, said classification yard having car retarders disposed between certain of the track switches so that a car passes through a succession of spaced car retarders in travelling from the hump to a classification track, weight indicating means subject to actuation in accordance with the weight of a car, weight storage and transfer means associated with the respective car retarders and initially effective to set up a storage for the first car retarder in said succession indicative of the weight of a car in response to said weight indicating means, said weight storage and transfer means being effective to transfer the weight storage of said weight storage means associated with the first car retarder to the weight storage for certain other car retarders selectively in accordance with the positions of the respective intervening facing point track switches, and car retarder control means for each of the car retarders for governing the degree of retardation in accordance with the condition of said weight storage means for the associated car retarder.

4. A car retarder control system for railroads comprising, a hump classification yard having several classification tracks fed through various track switches from a single track extending over a hump and having car retarders between several of the track switches so that a car passes through a succession of car retarders spaced by at least one facing point track switch in travelling from the hump to a classification track, a weighing device in said stretch of single track ahead of the first of said succession of car retarders, weight storage and transfer means associated with the respective car retarders initially effective to set up a storage for the first car retarder indicative of the weight of a car actuating said weighing device, said weight storage and transfer means being effective to transfer the weight storage of said weight storage means associated with the first car retarder to the weight storage means for certain other car retarders, selectively in accordance with the positions of the track switches, and car retarder control means for each of the car retarders for governing the degree of retardation in accordance with the condition of said weight storage means for the associated car retarder.

5. In a car retarder control system for railroads, a hump classification yard having several classification tracks connected by track switches to a single stretch of track extending over a hump, said classification yard having car retarders between certain of the track switches so that each car passes through a succession of car retarders spaced by at least one facing point track switch in travelling from the hump to a classification track, weight indicating means subject to actuation in accordance with the weight of a car, weight storage and transfer means associated with the respective car retarders and initially effective to set up a weight storage for the first car retarder in said succession in response to actuation of said weight indicating means, said weight storage and transfer means being effective to transfer the weight storage for the first car retarder to the weight storage means for the other car retarders in said succession as the car progresses in approach of said car retarders respectively, said transfer means being selectively governed by the track switches so as to transfer storages only to the storages associated with the car retarders in the route a car is to follow, and car retarder control means for each of the car retarders for governing the degree of retardation in accordance with the condition of said weight storage means for the associated car retarder.

6. A car retarder control system for railroads comprising, a hump classification yard having several classification tracks fed through track switches from a single track extending over a hump, said classification yard having car retarders between several of the track switches so that each car passes through a succession of car retarders spaced by at least one facing point track switch in travelling from the hump to a classification track, a weighing device in said stretch of single track ahead of the first of said succession of car retarders, weight storage and transfer means associated with the respective car retarders initially effective to set up a weight storage for the first car retarder in said succession in response to actuation by a car of said weighing device, said weight storage and transfer means being effective to transfer the weight storage for the first car retarder to the weight storage means for the other car retarders in succession as the car progresses in approach of said car retarders respectively, said transfer means being selectively governed by the track switches so as to transfer storages only to the storages associated with the car retarders in the route a car is to follow, and car retarder control means for each of the car retarders for governing the degree of retardation in accordance with the condition of said weight storage means for the associated car retarder.

7. A car retarder control system for railroads comprising, a hump classification yard having several classification tracks connected by track switches to a single stretch of track extending over a hump, said clasification yard having car retarders in said stretch of single track and along the trackway between certain of the track switches so that a car passes through a succession of car retarders spaced by at least one facing point track switch in travelling from the hump to one of the classification tracks, speed responsive apparatus for each of the car retarders having at least one speed relay controlled in accordance with the speed of a car passing through the associated car retarder, weight indicating means subject to actuation in accordance with the weight of a car, weight storage and transfer means associated with the respective car retarders and initially effective to set up a weight storage in said storage means for the first car retarder in said succession in response to actuation of said weight indicating means, said weight storage and transfer means being effective to transfer the weight storage for the first car retarder to the weight storage means for the other car retarders selectively in a succession corresponding to the route of a car as the car progresses, and car retarder control means for each of the car retarders for governing the degree of retardation in accordance with the condition of said weight storage means and said speed relay for the associated car retarder.

8. In a car retarder control system for railroads, a hump classifiication yard having several classification tracks connected by track switches to a single stretch of track extending over a hump, said classification yard having car retarders in said stretch of single track and between certain of the track switches so that a car passes through a succession of car retarders spaced by at least one facing point track switch in travelling from the hump to one of the classification tracks, radar speed responsive apparatus for each car retarder having speed relays selectively energized for different speeds of cars respectively passing through the associated car retarder, weight indicating means subject to actuation in accordance with the weight of a car, weight storage and transfer means associated with the respective car retarders and initially effective to set up a weight storage in said storage means for the first car retarder in said succession in response to actuation of said weight indicating means, said weight storage and transfer means being effective to transfer the weight storage for the first car retarder to the weight storage means for the other car retarders selectively in a succession corresponding to the route of a car as the car progresses, and car retarder control means for each of the car retarders for governing the degree of retardation in accordance with the condition of said weight storage means and said speed relays for the associated car retarder.

9. A car retarder control system for railroads comprising in combination, a hump classification yard having several classification tracks connected by track switches to a single track extending over a hump, said classification yard having car retarders between several of the track switches so that a car passes through a succession of car retarders spaced by at least one facing point track switch in travelling from the hump to a classification track, radar speed responsive apparatus for each car retarder having speed relays selectively energized for different speeds of cars respectively passing through the associated car retarder, a weighing device in said stretch of single track ahead of the first of said succession of car retarders, weight storage and transfer means associated with the respective car retarders initially effective to set up a weight storage in said storage means for the first car retarder in said succession in response to actuation by a car of said weighing device, said weight storage and transfer means being effective to transfer the weight storage for the first car retarder to the weight storage means for the other car retarders selectively in succession corresponding to the route of a car as the car progresses, and car retarder control means for each of the car retarders for governing the degree of retardation in accordance with the condition of said weight storage means and said speed relays for the associated car retarder.

10. A car retarder control system comprising, a hump classification yard having several tracks connected by track switches to a single stretch of track extending over a hump, said classification yard having car retarders in said stretch of track and between certain of the track switches so that a car passes through a succession of car retarders spaced by at least one facing point track switch in travelling from the hump to one of the classification tracks, speed responsive apparatus for each car retarder having at least one speed responsive relay selectively governed in accordance with the speed of a car passing through the associated car retarder, weight indicating means subject to actuation in accordance with the weight of a car, weight storage and transfer means associated with the respective car retarders and initially effective for the first car retarder in said succession in response to the actuation of said weight indicating means, said weight storage and transfer means being effective to transfer the weight storage for the first car retarder to the weight storage means for the other car retarders in said succession selectively in accordance with the positions of the track switches, and car retarder control means for each of the car retarders for governing the degree of retardation in accordance with the condition of said weight storage means and said speed relay for the associated car retarder.

11. In a car retarder control system, a hump classification yard having several tracks connected by track switches to a single stretch of track extending over a hump, said classification yard having car retarders between certain of the track switches so that a car passes through a succession of car retarders spaced by at least one facing point track switch in travelling from the hump to one of the classification tracks, radar speed responsive apparatus for each car retarder having speed responsive relays selectively energized for different speeds of cars respectively passing through the associated car retarder, weight indicating means subject to actuation in accordance with the weight of a car, weight storage and transfer means associated with the respective car retarders and initially effective for the first car retarder in said succession in response to the actuation of said weight indicating means, said weight storage and transfer means being effective to transfer the weight storage for the first car retarder to the weight storage means for the other car retarders in said succession selectively in accordance with the positions of the track switches, and car retarder control means for each of the car retarders for governing the degree of retardation in accordance with the condition of said weight storage means and said speed relays for the associated car retarder.

12. A car retarder control system for railroads comprising, a hump classification yard having several classification tracks fed through various track switches from a single track extending over a hump and having car retarders between several of the track switches so that each car passes through a succession of car retarders spaced by at least one facing point track switch in travelling from the hump to a classification track, radar speed responsive apparatus for each car retarder having speed responsive relays selectively energized for different speeds of cars respectively passing through the associated car retarder, a weighing device in said stretch of single track ahead of the first of said succession of car retarders, weight storage and transfer means associated with the respective car retarders initially effective to set up a storage for the first car retarder in said succession indicative of the weight of a car actuating said weighing device, said weight storage and transfer means being effective to transfer the weight storage for the first car retarder to the weight storage means for the other car retarders in said succession selectively in accordance with the positions of the track switches, and car retarder control means for each of the car retarders for govering the degree of retardation in accordance with the condition of said weight storage means and said speed responsive means for the associated car retarder.

13. A car retarder control system comprising in combination, a hump classification yard having several classification tracks connected by track switches to a single stretch of track extending over a hump, said classification yard having car retarders in said stretch of track disposed between several of the track switches so that a car passes through a succession of spaced car retarders in passing from the hump to a classification track, speed responsive apparatus for each of the car retarders having at least one speed relay selectively conditioned in accordance with the speed of a car passing through the associated car retarder, automatic switching apparatus for governing the operation of said track switches in accordance with designated destinations for cars to be classified, weight indicating means subject to actuation in accordance with the weight of a car, weight storage and transfer means associated with the respective car retarders and initially effective to set up a weight storage for the first car retarder in said succession in response to the actuation of said weight indicating means, said weight storage and transfer means being effective to transfer the weight stored by said weight storage means for said first car retarder to the weight storage means for another car retarder as selected by the position of one of said track switches, and car retarder control means for each of the car retarders for governing the degree of retardation in accordance with the condition of said weight storage means and the condition of said speed responsive apparatus for the associated car retarder, said car retarder control means for certain of the car retarders being effective to modify the degree of retardation in accordance with the condition of said automatic switching apparatus.

14. A car retarder control system according to claim 13 wherein the speed responsive apparatus comprises radar speed measuring apparatus having an antenna with a radiation pattern including at least the area of the associated retarder.

15. A car retarder control system according to claim 14 wherein means is provided for rendering the speed responsive apparatus for a given retarder effective to govern the control means for that retarder only provided a car has progressed to a given area in approach of the given retarder.

16. A car retarder control system according to claim 15 wherein the given area is defined by a track circuit in approach of the given retarder.

17. A car retarder control system comprising, a hump classification yard having several classification tracks connected by track switches to a single stretch of track extending over a hump, said classification yard having car retarders disposed between several of the track switches so that a car passes through a succession of spaced car retarders in travelling from the hump to a classification track, automatic switching apparatus for governing the operation of said track switches in accordance with designated destinations for cars to be classified, weight indicating means subject to actuation in accordance with the weight of a car, weight storage and transfer means associated with the respective car retarders and initially effective to set up weight storage for the first car retarder in response to the actuation of said weight indicating means, said storage and transfer means being effective to transfer the weight stored by said weight storage means for said first car retarder to the storage means for other car retarders as selected by the positions to which the track switches are operated by said automatic switching apparatus, and car retarder control means for each of the car retarders for governing the degree of retardation in accordance with the condition of said weight storage means for the associated car retarders, said car retarder control means for certain of the car retarders being effective to modify the degree of retardation in accordance with the condition of said automatic switching apparatus.

18. In a car retarder control system, a classification yard having several classification tracks fed through various track switches from a single stretch of track extending over a hump and having car retarders disposed between several of the track switches so that a car passes through a succession of spaced car retarders in passage from the hump to a classification track, automatic switching apparatus for governing the operation of said track switches in accordance with designated destinations for cars to be classified, a weighing device in said single stretch of track ahead of the first of said succession of car retarders, weight storage and transfer means associated with the respective car retarders initially effective to set up a weight storage for the first car retarder indicative of the weight of a car actuating said weighing device, said weight storage and transfer means being effective to transfer the weight stored by said weight storage means for said first car retarder to the storage means for other car retarders as selected by the positions to which the track switches are operated by said automatic switching apparatus, and car retarder control means for each of the car retarders for governing the degree of retardation in accordance with the condition of said weight storage means for the associated car retarder, said car retarder control means for certain of the car retarders being effective to modify the degree of retardation in accordance with condition of said automatic switching apparatus.

19. In a car retarder control system, a hump classification yard having several classification tracks connected by track switches to a single stretch of track extending over a hump, said classification yard having car retarders so disposed between several of the track switches that a car passes through a succession of spaced car retarders in passing from the hump to a classification track, radar speed responsive apparatus for each of the car retarders having speed relays selectively conditioned in accordance with the speed of a car passing through the associated car retarder, automatic switching apparatus for governing destinations for cars to be classified, weight indicating means subject to actuation in accordance with the weight of a car, weight storage and transfer means associated with the respective car retarders and initially effective to set up a weight storage for the first car retarder in said succession in response to the actuation of said weight indicating means, said weight storage and transfer means being effective to transfer the weight stored by said weight storage means for said first car retarder to the weight storage means for another car retarder as selected by the position of one of said track switches, and car retarder control means for each of the car retarders for governing the degree of retardation in accordance with the condition of said weight storage means and the condition of said speed control relays for the associated car retarder, said car retarder control means for certain of the car retarders being effective to modify the degree of retardation in accordance with the condition of said automatic switching apparatus.

20. A car retarder control system comprising in combination, a classification yard having several classification tracks connected through various track switches to a single stretch of track extending over a hump, said classification yard having car retarders so disposed between several of the track switches that a car passes through a succession of spaced car retarders in passing from the hump to a classification track, radar speed responsive apparatus for each of the car retarders having speed relays selectively conditioned in accordance with the speed of a car passing through the car retarder, automatic switching apparatus for governing the operation of said track switches in accordance with designated destinations for cars to be classified, a weighing device in said single stretch of track, weight storage and transfer means associated with the respective car retarders initially effective to set up a weight storage for the first car retarder in said succession indicative of the weight of a car actuating said weighing device, said weight storage and transfer means being effective to transfer the weight stored by said weight storage means for said first car retarder to the weight storage means for another car retarder as selected by the position of one of said track switches, and car retarder control means for each of the car retarders for governing the degree of retardation in accordance with the condition of said weight storage means and the condition of said speed control relays for the associated car retarder, said car retarder control means for certain of the car retarders being effective to modify the degree of retardation in accordance with the condition of said automatic switching apparatus.

21. A car retarder control system for railroads comprising in combination, a hump classification yard having several classification tracks fed through various track switches from a single track extending over a hump and having car retarders between several of the track switches and in said stretch of single track, automatic switching apparatus for govering the operation of said track switches in accordance with designated destinations for cars to be classified, and automatic control means for each of the car retarders for governing the degree of retardation in accordance with the speed and weight of the respective cars passing through the associated car retarder, said automatic control means also being effective for certain of the car retarders for selectively modifying the degree of retardation in accordance with the route description for a car as set up by said automatic switching apparatus.

22. A car retarder control system for railroads comprising in combination, a hump classification yard having several classification tracks fed through various track switches from a single track extending over a hump and having car retarders in said single track and between certain of the track switches, automatic switching apparatus for governing the operation of the track switches in accordance with designated destinations for cars to be classified, said automatic switching apparatus having route storage banks of relays for the respective track switches, and automatic control means for each of the car retarders for governing the degree of retardation in accordance with the speed and weight of the respective cars passing through the associated car retarder, said automatic control means also being effective for certain of the car retarders for selective modifying the degree of retardation in accordance with the route description for a car passing through that car retarder as defined by the condition of the relays of said route storage bank for the preceding track switch for defining the route of the car.

23. In combination with a stretch of railway track equipped with a car retarder operable to exert different breaking forces and having control means responsive to current selectively supplied thereto to select one of said braking forces, a car weight determining means including an operating element mounted in the stretch and operable to a first, a second, and a third circuit controlling position in response to a first, a second, and a third car weight respectively; a first, and a second weight information storage relay normally deenergized, pickup circuit means including said positions of said weight determining means with connections to said storage relays to energize said first relay only in response to said first car weight, to energize both said relays in response to said second car weight and energize said second relay only in response to said third car weight, a stick circuit means including a contact closed in response to a car passing through the retarder with connections to said storage relays to retain them energized in the arrangement previously effected by the weight determining means, and control circuit means including contacts of said storage relays with connections to the retarder control means to selectively supply current thereto according to the energized arrangement of the storage relays.

24. In combination with a stretch of railway track equipped with a car retarder having a control means and operable to exert different braking forces according to the manner in which current is selectively supplied to said control means, a car weighing device having an operating element mounted in the stretch and operable by each pair of wheels of a car approaching the retarder, said device having a biased position to which it resets and a first, a second and a third position to which it is operated in response to the pairs of wheels of cars of a first, a second and a third weight respectively, weight transfer relay means, a first and a second weight storage relay normally deenergized, circuit means including a contact closed at the first operated position of said device and deenergized position contacts of said storage relays with connections to the transfer relay means to energize the transfer relay means while a car moves over said operating element, pickup circuit means including a contact closed at the biased position of said device, a contact closed when said transfer relay means is energized and contact selectively closed according to the position to which said device is operated with connections to said storage relays to energize said first storage relay only, to energize both said storage relays or to energize said second storage relay only in response to operation of said device to its first, second, or third position, respectively, a stick circuit means including a contact closed when a car occupies the retarder with connections to said storage relays to retain them energized in the arrangement previously effected by said pickup circuit means, and control circuit means including contacts of said storage relays with connections to the retarder control means to selectively supply current thereto according to the energized arrangement of the storage relays.

25. In combination with a stretch of railway track over which cars move in a given direction, said stretch being equipped with a car retarder operable to exert different braking forces and a retarder control means responsive to current selectively supplied thereto to select between said braking forces, a car weight responsive means including an operating element and three registering relays one for each of three different car weights, said operating element mounted in the stretch in the approach to the retarder and responsive to each pair of car wheels of a car approaching the retarder, said operating element being operable to a different circuit controlling position for each of said different car weights, pickup circuit means including said positions of the operating element with connections to the registering relays to selectively energize the relays according to the weight of a car, a first and a second weight information storage relay normally deenergized, another pickup circuit means including contacts of said registering relays with connections to said storage relays to energize said first storage relay only in response to a first one of said car weights, to energize both said storage relays in response to a second one of said car weights and to energize said second storage relay only in response to a third one of said car weights, stick circuit means including a contact closed in response to a car passing through the retarder with connections to said storage relays to retain them energized in the arrangement previously effected by their pickup circuit means, and control circuit means including contacts of the storage relays and having connections to the retarder control means to selectively supply current thereto according to the energized arrangement of the storage relays to thereby set up a different braking force for the retarder for each of said car weights prior to the car entering the retarder.

26. In a railway classification yard having a switching track which diverges into a relatively large number of classification tracks, the yard being provided with intermediate car retarders located for at least one retarder to be in each track leading from the switching track to each individual classification track, each said retarder being operable to exert different braking forces according to the manner control current is supplied thereto, the combination comprising, a car weighing device having an element mounted in the switching track and operable from a biased position toward an extreme position to an extent determined by the weight of a car and its contents, an initial car weight storage means having connections to said device and energized to an extent determined by the weight of the car operating said device, circuit means including a contact responsive to a car occupying the switching track with connections to said initial storage means to retain the storage means energized at the extent previously energized, other car weight storage means one for each of the intermediate retarders, each said other storage means having connection with its retarder to control the manner current is supplied to the retarder according to the extent that storage means is energized, special circuit means including contacts of said initial weight storage means and non-completed connections to each of said other weight storage means and effective to energize any said other storage means to an extent corresponding to the extent the initial storage means is energized when the connections to that said other storage means are completed, and contact means responsive to a car cut moving from the switching track to any one of the classification tracks to complete said circuit connections to the weight storage means for the retarder through which the car cut passes in moving to that classification track.

27. In a railway classification yard having a switching track which diverges into a relatively large number of classification tracks, the yard being provided with intermediate car retarders located for at least one retarder to be in each track leading from the switching track to each individual classification track, each said retarder being operable to exert different braking forces according to the manner control current is supplied thereto, the combination comprising, a car weighing-device having an element mounted in the switching track and operable to a plurality of different positions to classify cars passing over said element into a plurality of different car weight groups, an initial group of car weight storage relays energizable in a different combination for each said car weight group and having connections to said device to store by the combination in which the relays are energized the weight group of a car passing said element, a stick circuit means with connections to said initial group of storage relays and including a contact responsive to a car occupying the switching track to retain the storage relays energized in the combination previously energized by said device, other groups of car weight storage relays one for each of the intermediate retarders and each said other group of relays energizable in a different combination for each of said car weight groups, each said other group of relays controlling connections to its retarders to determine the manner control current is supplied to the retarder according to the combination in which that relay group is energized, special circuit means including contacts of the relays of said initial weight storage group and non-completed connections to each of said other groups of weight storage relays, said special circuit means effective to energize any of the said other groups of storage relays in the combination corresponding to that at which the initial group of relays is energized at any time the connections to any of said other groups are completed, and circuit completing contacts responsive to a car moving from the switching track toward the classification tracks to complete the connection of said special circuit means to the said other group of weight storage relays for the retarder located in the track leading to the classification track toward which the particular car is moving.

28. In a railway classification yard having a hump track which diverges into a relatively large number of classification tracks and formed for car cuts to move toward the classification tracks under the action of gravity, the yard being provided with intermediate car retarders located at selected points in the tracks leading from the hump track to the classification tracks for controlling the speed of car cuts moving toward the classification tracks, the combination comprising, a car weight determining means including a weighing device having an element mounted in the hump track and operable to classify the weight of a car cut according to a plurality of different car weight groups, initial electric car weight storage means with connections to said device and including contacts responsive to a car cut occupying the hump track to store and retain the weight group information of a car cut as it moves over the hump track, other electric car weight storage means one for each of said retarders, each said other car weight storage means being energizable in a different arrangement for each of said car weight groups and having connections with its associated retarder to control the braking force exerted by the retarder according to the arrangement in which it is energized, special circuit means including contacts of said initial car weight storage means with connections to said other car weight storage means to energize the other storage means in the arrangement corresponding to the weight group stored in the initial storage means but normally ineffective, and contacts responsive to a car cut moving from the hump track toward any selected one of the classification tracks to render said special circuit means effective to energize the other weight storage means for the retarder through which the car cut passes in moving to the selected one of the classification tracks.

29. In a railway classification yard having a first track from which car cuts move to a second or a third track according as a track switch in the first track is set at its normal or reverse position, the yard being provided with a car retarder located in the track leading from the track switch to the second track and operable to exert different braking forces according to the manner control current is applied thereto, the combination comprising, a control relay group energizable in different combinations, circuit means including contacts of said control relay group with connections to said retarder to control the manner control current is applied to the retarder according to the energized combination of the relay group, control circuit means including a device having contacts operable to different positions and having connections to said relay group to energize the group at different combinations according to the position of said device, a detector track circuit for the track switch including a track relay which is energized or deenergized according as the detector track circuit is not or is occupied by a car cut, switch control means having a contact operable to a first or a second position according as the track switch is normal or reverse, and a contact of said track relay and said contact of the switch control means interposed in said control circuit means to render the control circuit means effective to energize said relay group only when a car cut occupies said track circuit with the track switch normal.

30. In a railway classification yard having a first track from which car cuts move to a second or a third track according as a track switch in the first track is set at its normal or reverse position, the yard being provided with a car retarder located in the track leading from the track switch to the second track and operable to exert different braking forces according to the manner control current is supplied thereto, the combination comprising, a car weighing means having an element mounted in the first track and operable to a plurality of different positions according to the weight of a car passing over said element, a group of weight storage relays energizable in a plurality of different combinations, circuit means including contacts closed at the different combinations of said storage relays and having connections to the car retarder to determine the manner current is supplied to the retarder, a detector track circuit for the track switch including a track relay which is energized or deenergized according as the track circuit is not or is occupied by a car, a detector contact closed in a first or a second position according as said switch is positioned normal or reverse respectively, and control circuit means including contacts closed according to the position of said weighing means, the first position detector contact, and a back contact of said track relay having connections to said storage relays to energize the storage relays at a combination determined by the weight of a car passing said element.

31. In a railway classification yard having a hump track which diverges into a plurality of classification tracks and in which yard the speed of car cuts is governed by a master car retarder located in the hump track and intermediate car retarders located at selected points in the tracks leading from the hump track to the classification tracks, said yard being provided with a car weight determining means having a weighing device located in the approach to the master retarder and a group of weight storage relays, the weighing device being operable to different positions to classify car cuts into a plurality of different car weight groups, the group of storage relays having connections with the weighing device and energizable in a different combination for each of the different car weight groups, the storage relays having connections with the master retarder to control the braking force exerted by that retarder according to the energized combination of the storage relays, the combination comprising, a group of weight storage relays for each of the intermediate retarders of the yard, each said intermediate retarder weight storage relay group energizable in a different combination for each of the plurality of car weight groups and having connections to its intermediate retarder to control the braking force exerted by the retarder according to the combination of which the storage relay group is energized, circuit means including contacts of the master retarder weight storage relay group with connections to the weight storage relay groups of the intermediate retarders and operable to energize any selected one of the weight storage relay groups for the intermediate retarders in the combination in which the weight storage relay group of the master retarder is energized, and control means operable to different conditions and having contacts interposed in said circuit means to select which one of said intermediate retarder weight storage relay groups is to be energized.

32. In a railway classification yard having a hump track which diverges into a plurality of classification tracks and in which yard the speed of car cuts is governed by a master car retarder located in the hump track and by intermediate car retarders located at selected points in the tracks leading from the hump track to the classification tracks, said yard being provided with car weight determining means having a weighing device located in the approach to the master retarder and a car weight storage means with connections to the weighing device and energizable in different arrangements according to the weight of a car cut as registered by the weighing device, said weight storage means having connections to the master retarder to control the braking force exerted thereby according to the energized arrangement of the storage means, the combination comprising, a car weight storage means for each intermediate retarder of the yard, each said intermediate retarder car weight storage means energizable in different arrangements and having connections to its intermediate retarder to control the braking force exerted by that retarder according to the arrangement in which it is energized, circuit means controlled by contacts of the master retarder weight storage means and having connections to the intermediate retarder weight storage means and operable to energize the weight storage means of the intermediate retarders in the arrangement corresponding to that at which the weight storage means of the master retarder is energized, and control means having contacts interposed in said circuit means and operable to different conditions to select which intermediate retarder weight storage means is to be energized.

33. In a railway classification yard having a hump track which diverges into a relatively large number of classification tracks and formed for car cuts to move toward the classification track under the action of gravity, the yard being provided with car retarders located at selected points in the tracks leading from the hump track to the classification tracks for controlling the speed at which the car cuts move into the classification tracks, the combinations comprising, a car weight determining means including a weighing device and an initial electric weight storage means, said weighing device having an element mounted in the hump track and operable to register the weight of car cuts according to a plurality of different car weight groups, said initial weight storage means having connections with said device and energizable in a different arrangement for each of said car weight groups, other electric car weight storage means one for each of said retarders, each said other electric car weight storage means energizable in a different arrangement for each of said car weight groups and having connections with its associated retarder to control the braking force exerted by the retarder different for each of its energizable arrangements, circuit means including contacts of said initial weight storage means and connections to each of said other weight storage means to energize any of said other weight storage means to which it is effectively connected in an arrangement corresponding to the energized arrangement of said initial weight storage means, and means including contacts responsive to a car cut as it moves toward any selected one of the classification tracks to render effective said circuit means connections to the weight storage means for the retarder through which the car cut passes in moving toward its selected classification track.

34. In a railway classification yard having a hump track which diverges through track switches to classification tracks and in which yard car cuts moving from the hump track to the classification tracks are controlled by car retarders located one in each track leading from the hump track to a classification track, said yard being provided with automatic switching apparatus having a control device for each classification track and operable to store the route description from the hump track to any classification track whose device is actuated, and to set up the route as a car cut moves over the track switches toward the designated classification track, the combination comprising, a car weighing device having an element mounted in the hump track and operable to different positions to classify cars moving over said element into different car weight groups according to the position to which the element is operated, an initial car weight storage relay group having connections to said weighing device and energizable in a different combination for each car weight group, occupancy relay means associated with said hump track and operable to a first or a second position according as a car cut does or does not occupy the hump track, stick circuit means including a contact of said occupancy relay means with connections to said initial relay group to retain the relay group in a previously energized combination, other car weight storage relay groups one for each said retarder of the yard, each said other car weight storage relay group energizable in a different combination for each of said car weight group and operable to control the associated retarder according to the combination at which it is energized, and special circuit means including contacts of said initial car weight storage relay group and contacts of said automatic switching apparatus and having connections to said other car weight storage relay groups to energize the weight storage relay groups to energize the weight storage relay group of a retarder located in the route stored for a car cut in a combination corresponding to the energized combination of the initial weight storage relay group.

35. In a railway gravity-type yard having a hump track which diverges through track switches to several classification tracks and which yard is provided with car retarders located at least one in each track leading from the hump track to a classification track, each retarder being operable to exert different braking forces according to the manner current is applied thereto, the yard being also provided with automatic switching apparatus having a control device for each classification track and route storage relay units one for each track switch location, the switching apparatus being operable to storage the route description from the hump track to any classification track whose control device is operated and to forward the route description from one route storage unit to the next successive unit through transfer and destination relays of the unit as a car cut moves toward the designated classification track, the combination comprising, a car weight determining means including a weighing device and an initial weight storage relay group, said weighing device having an element mounted in the hump track and operable to different positions to classify car cuts into a plurality of different weight groups, said initial weight storage relay group energizable in a different combination for each said car weight group and having connections to said weighing device to store the weight group of a car by the combination at which the relay group is energized, other weight storage relay groups one for each of the car retarders and each said other relay group energizable in a different combination for each said car weight group, each said other weight storage relay group having connections to the associated retarder to control its braking force according to the energized combination of the relay group, weight storage units one for each route storage unit of the yard, each said weight storage unit including a first and a second relay bank the relays of each of which banks are energizable in a different arrangement for each of said car weight groups, circuit means for each said weight storage unit including contacts of the transfer and destination relays of the associated route storage unit to cascade a car weight group stored in the first bank to the second bank, and special circuit means including contacts of said initial weight storage relay group and contacts of the relay banks of the successive weight storage units to forward the car weight group stored in the initial weight storage relay group to the retarder through which a car cut passes in its route to a classification track in step with the forwarding of the route description through the successive route storage units.

36. In a railway classification yard having a hump track which diverges through track switches to classification tracks and in which yard the speed of car cuts moving from the hump track to the classification tracks is governed by a master car retarder located in the hump track and intermediate retarders located at selected points in the tracks leading from the hump track to the classification tracks, said yard being provided with automatic switching apparatus operable to store the route from the hump track to any one of the classification tracks and to set up a stored route as the car cut moves towards its classification track, said yard being further provided with car weight determining means with connections to the master retarder for control of that retarder according to the weight of a car cut, said weight determining means including a weighing device located in the approach to the master retarder and a weight storage means energizable in different arrangements according to the weight of a car cut as determined by the weighing device, the combination comprising, a car weight storage means for each intermediate retarder of the yard and energizable in different arrangements and having connections to its retarder to control the braking force exerted by the retarder according to the arrangement in which it is energized, and circuit means having connections with the weight storage means of the master retarder and with the weight storage means for the different intermediate retarders and including contacts of the automatic switching apparatus to energize the weight storage means for the intermediate retarder through which a particular car cut passes in its route to its classification track in the arrangement corresponding to that at which the master retarder weight storage means is energized.

37. A car retarder control system comprising in combination, a stretch of track over which each car rolls by gravity in transit to a plurality of classification tracks, a car retarder disposed along said stretch of track and being controllable to different braking conditions to vary the speed at which each car leaves said retarder, route designating means distinctively controlled for a car according to its preselected classification track prior to its entering said retarder, control means for acting on said car retarder effective to cause the exit speed of said car from said retarder to be of a selected value, said control means including means associated with respective classification tracks and capable of acting on said control means selectively in accordance with the condition of said route designating means to affect said exit speed from said retarder in accordance with the route to be traversed by said car after leaving the retarder.

References Cited by the Examiner

UNITED STATES PATENTS

| | | | |
|---|---|---|---|
| 1,626,920 | 5/1927 | Coleman | 104—26.1 |
| 1,766,539 | 6/1930 | Prescott | 104—26.1 X |
| 1,785,725 | 12/1930 | Alexander | 246—41 |
| 1,860,661 | 5/1932 | Dixon. | |
| 1,875,839 | 9/1932 | Alexander et al. | 246—29 |
| 2,045,695 | 6/1936 | Brown. | |
| 2,139,324 | 12/1938 | Abeloos | 246—124 X |
| 2,184,544 | 12/1939 | Brooks | 104—26 |
| 2,194,353 | 3/1940 | Brown et al. | |
| 2,216,610 | 10/1940 | Culbertson | 246—2 X |
| 2,222,804 | 11/1940 | Sorensen | 246—41 |
| 2,361,466 | 10/1944 | Fitzsimmons | 246—29 X |
| 2,477,567 | 8/1949 | Barker. | |
| 2,494,435 | 1/1950 | Freeman | 246—29 X |
| 2,625,597 | 1/1953 | Dodd. | |
| 2,629,865 | 2/1953 | Barker. | |
| 2,643,369 | 6/1953 | Manley | 340—171 |
| 2,700,728 | 1/1955 | Brixner et al. | 246—2 X |
| 2,880,307 | 3/1959 | Martin | 246—41 X |

ARTHUR L. LA POINT, *Primary Examiner.*

S. SAPERSTEIN, JAMES S. SHANK, LEO QUACKENBUSH, LEO J. LEONNIG, *Examiners.*

S. T. KRAWCZEWICZ, *Assistant Examiner.*